June 14, 1932. H. E. ENSLIN 1,862,890
PREPARING AND ASSEMBLING PARTS OF SHOE UPPERS
Filed Feb. 27, 1924 8 Sheets-Sheet 1

INVENTOR.
Herbert E. Enslin
By his Attorney

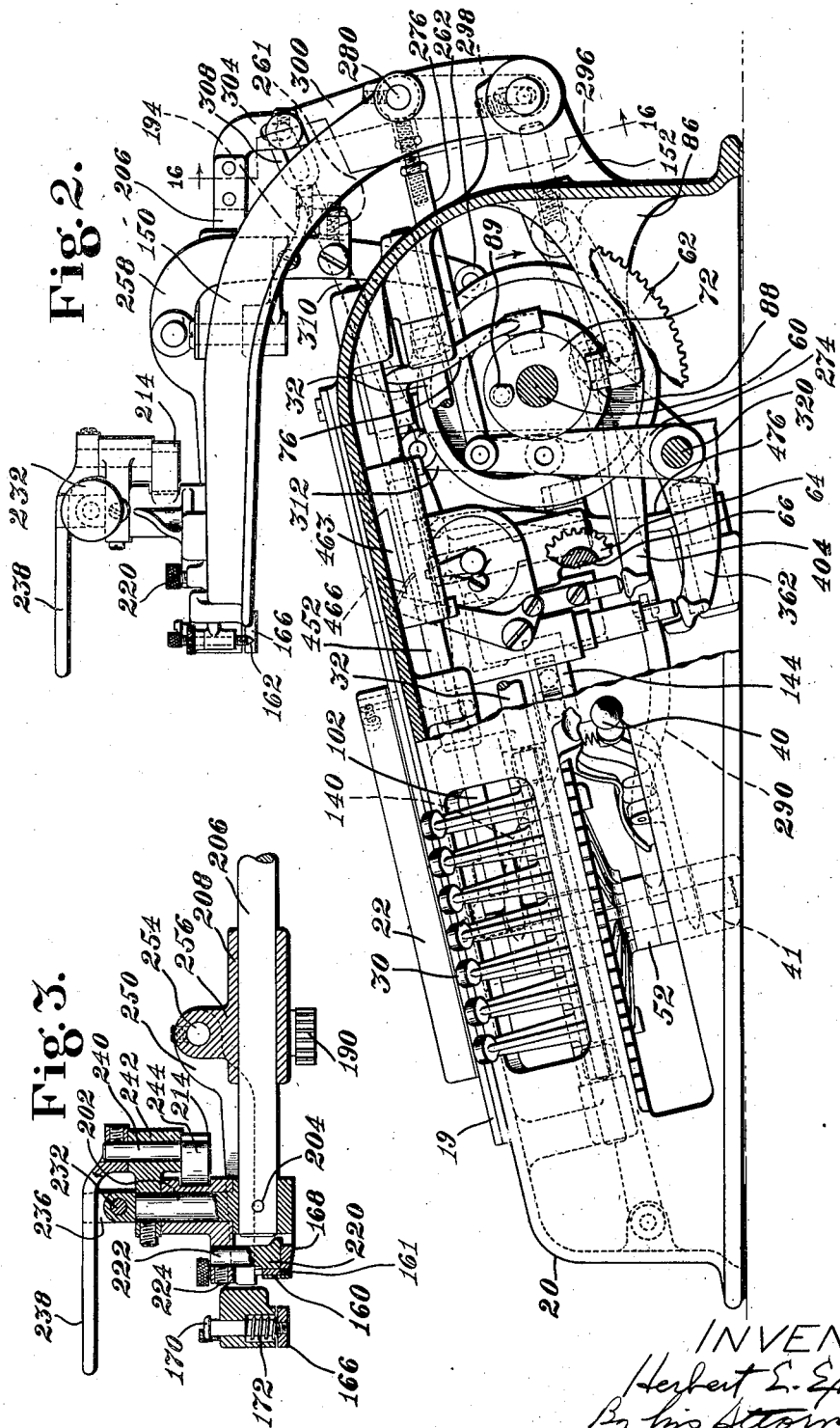

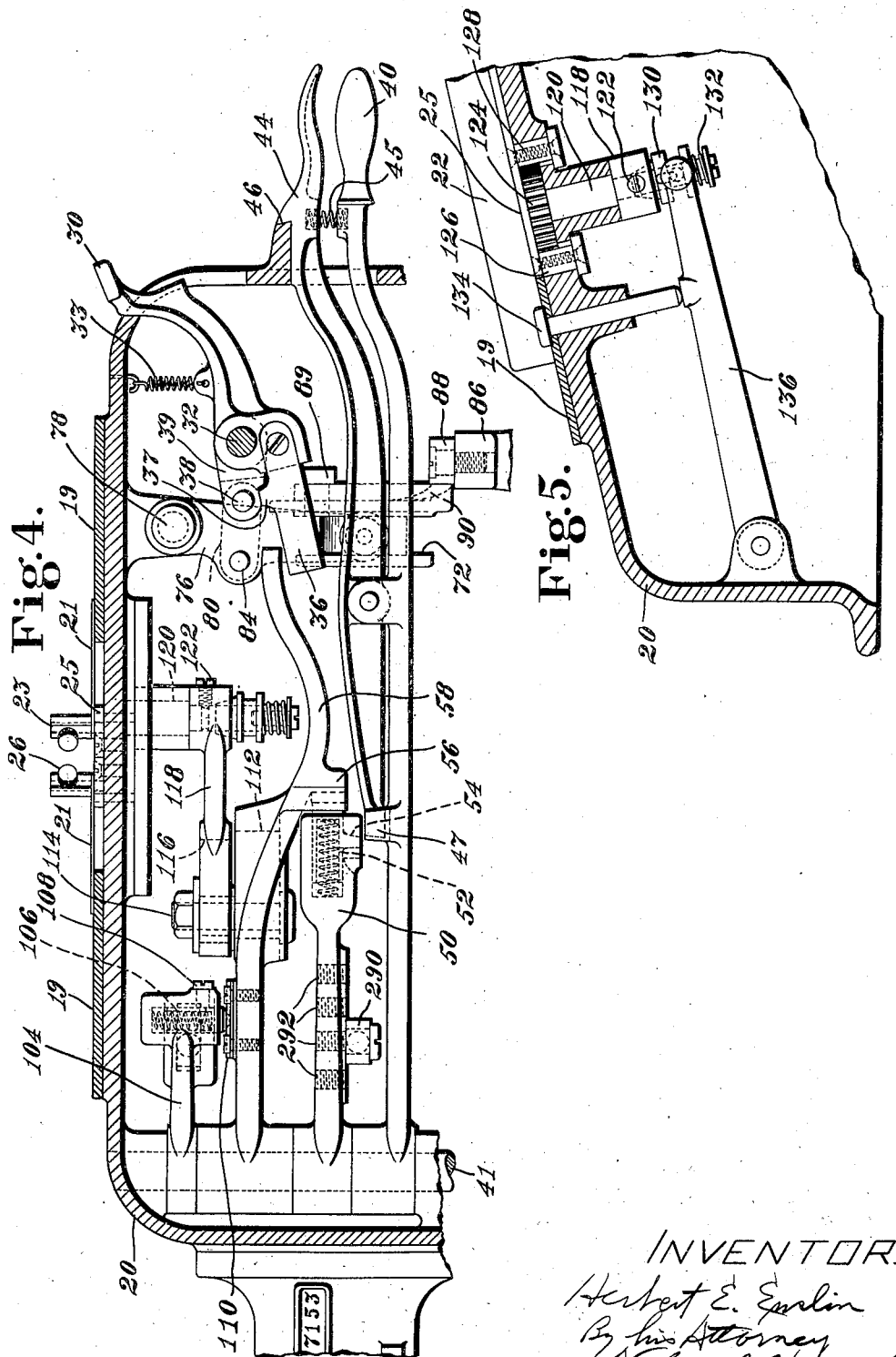

June 14, 1932. H. E. ENSLIN 1,862,890
PREPARING AND ASSEMBLING PARTS OF SHOE UPPERS
Filed Feb. 27, 1924 8 Sheets-Sheet 4

INVENTOR
Herbert E. Enslin
By his Attorney,
Nelson N. Howard

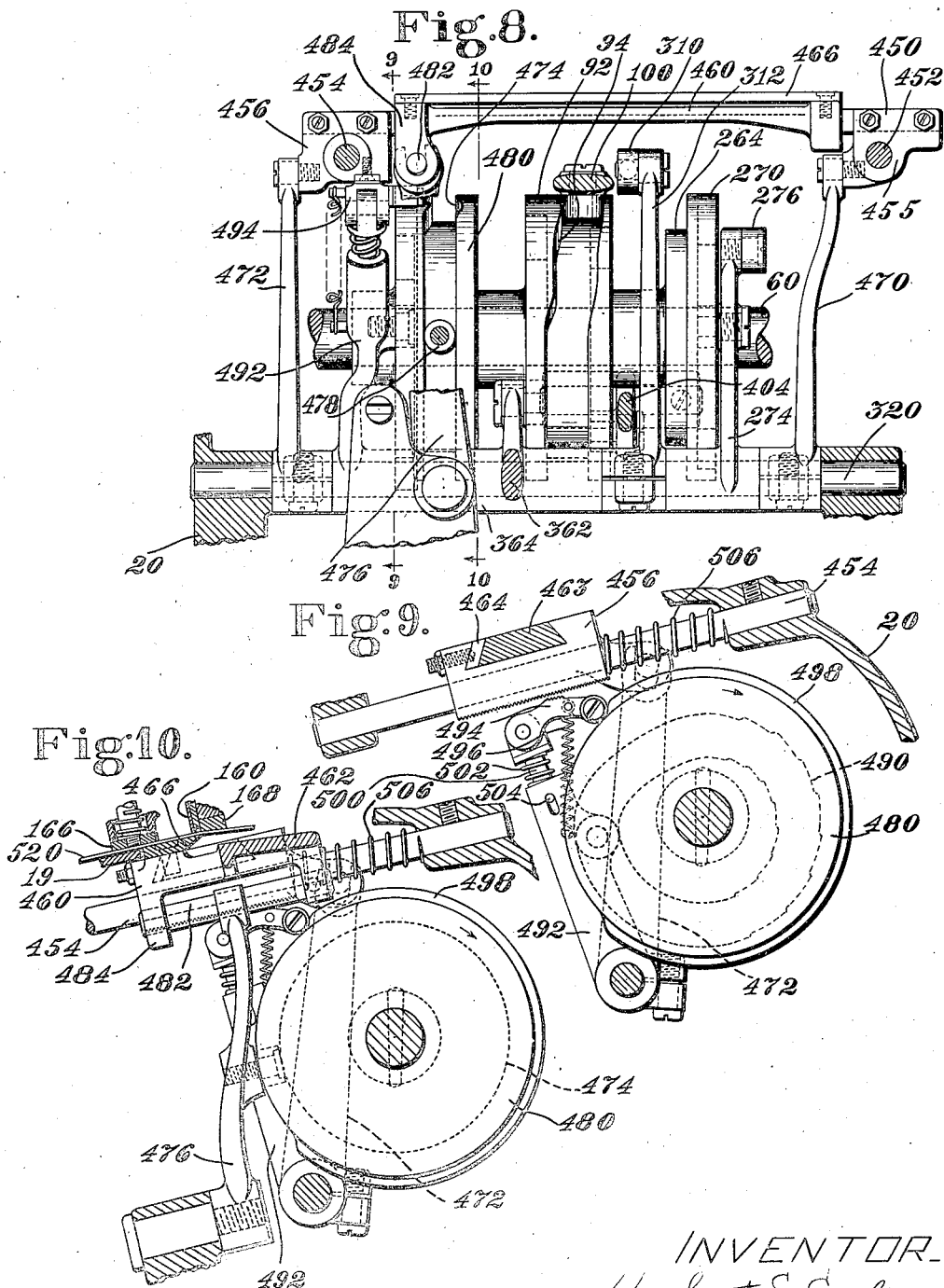

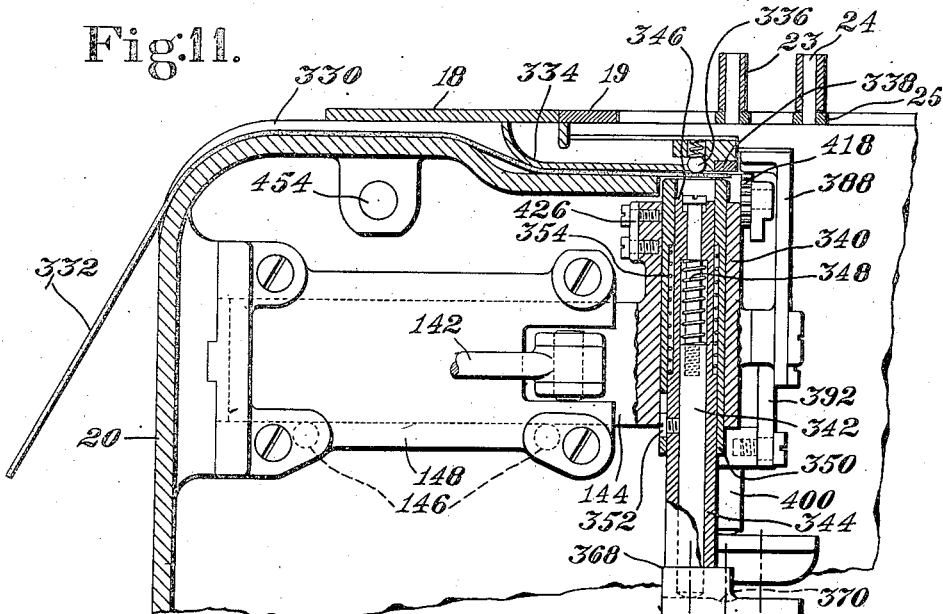
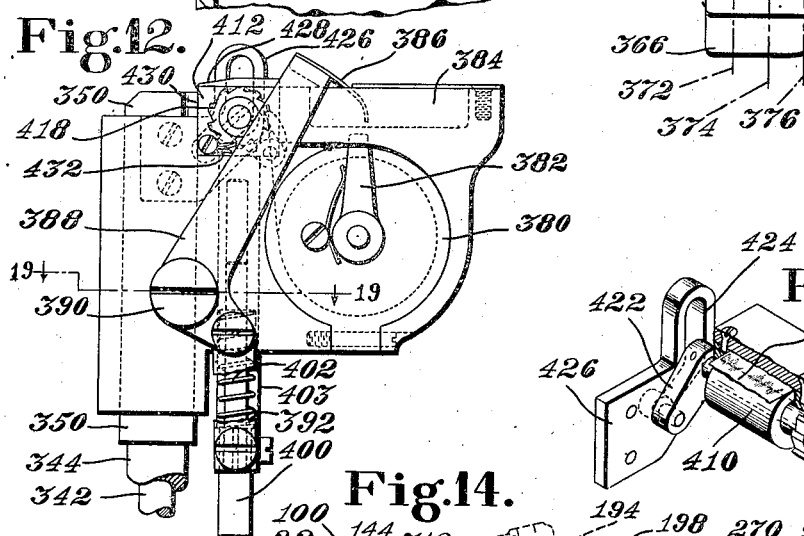
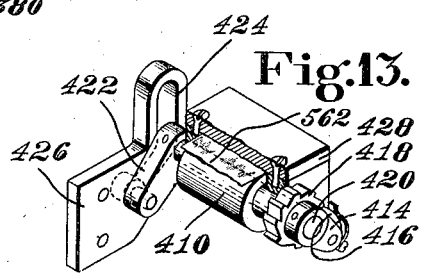
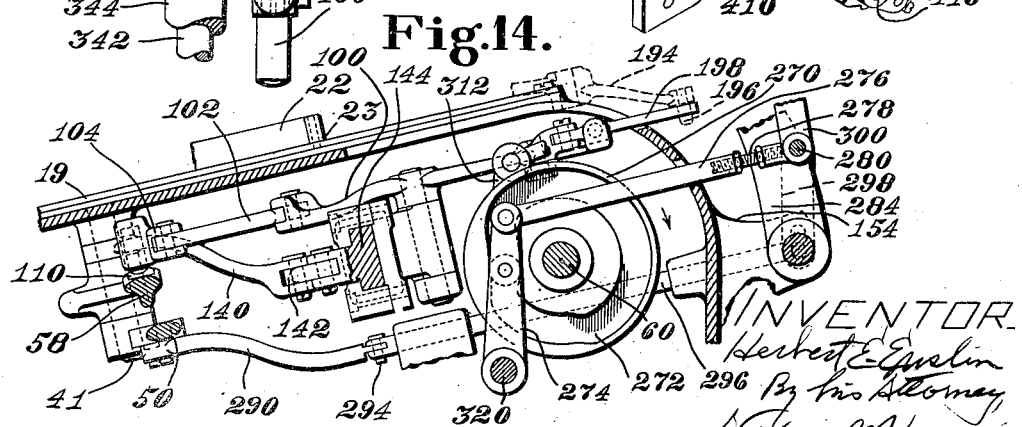

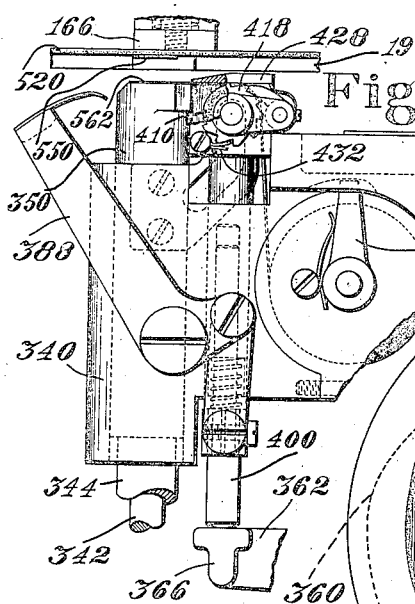
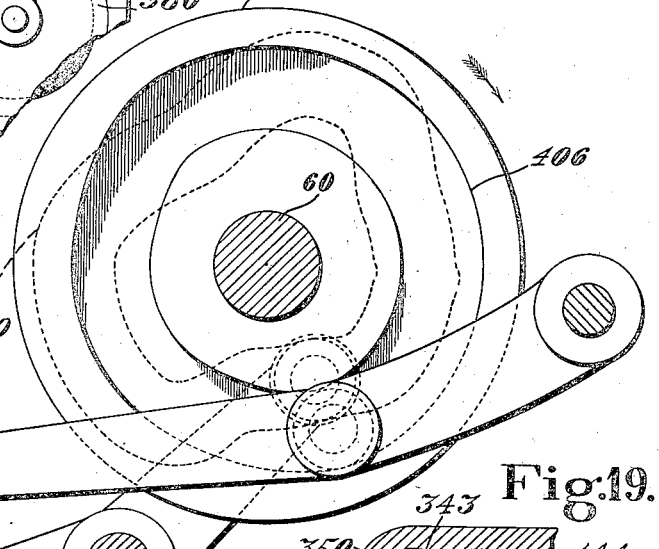
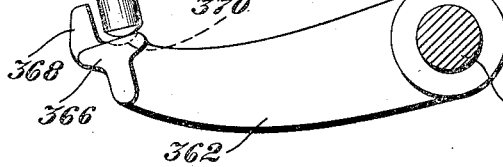
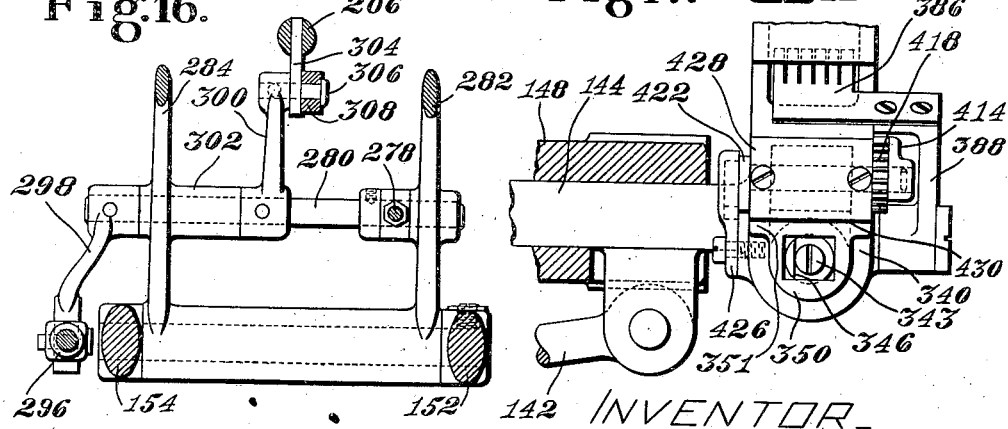

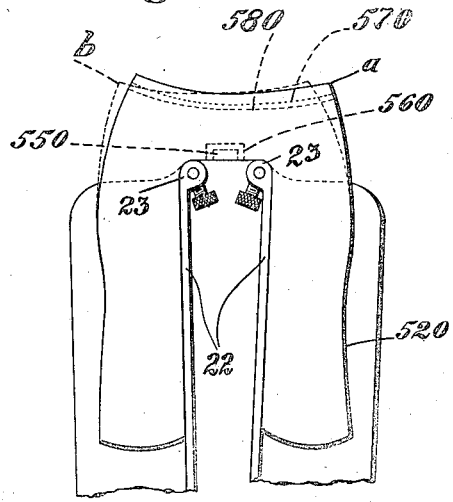
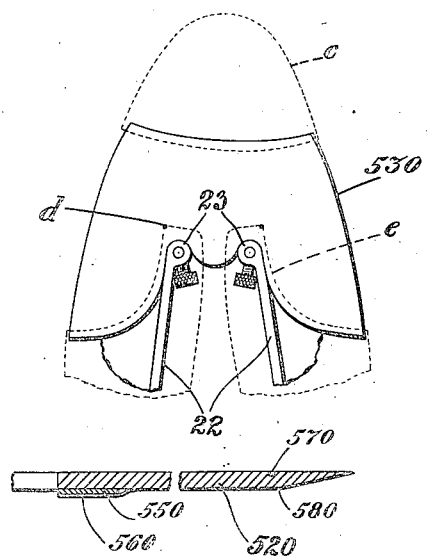
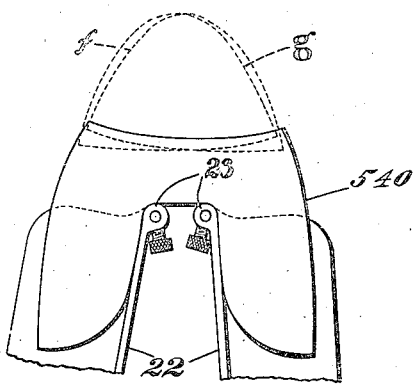

UNITED STATES PATENT OFFICE

HERBERT ELLIOT ENSLIN, OF BEVERLY, MASSACHUSETTS, ASSIGNOR TO UNITED SHOE MACHINERY CORPORATION, OF PATERSON, NEW JERSEY, A CORPORATION OF NEW JERSEY

PREPARING AND ASSEMBLING PARTS OF SHOE UPPERS

Application filed February 27, 1924. Serial No. 695,567.

This invention relates to the preparation and assembling of the uppers of shoes. The invention is illustrated as embodied in a machine especially designed to facilitate the preparation and assembling of shoe tips, vamps and quarters.

The successful fit and appearance of the upper of a shoe depends very largely upon the accuracy and care with which the tip or toe cap and the quarters are positioned relatively to the vamp as they are assembled. Machines have been designed for applying marks to the vamp to guide the stitchers in the assembling of these parts. Such machines have not met with general success, however, because of the time required for their use and the resulting expense of operation. It has also been customary in many factories to apply a reinforcing tab to the under side of the vamp near its throat to give added strength to the shoe, especially in vamps intended for Balmoral shoes. This operation is commonly a hand operation and performed separately from the other work of preparing the vamp. Further, most factories find it necessary to trim or skive the forward portion of a vamp after the tip has been attached to remove the surplus material which projects forwardly of the tip seam inside the shoe and which would therefore be objectionable to the wearer.

An important object of the invention is, therefore, to facilitate various preparatory operations such as those above indicated to obtain correct and economical assembling of shoe upper parts.

In the usual arrangement of modern shoe factories, the vamps for a case of shoes are prepared by the cutter and delivered in a bundle to the stitching room. Such a bundle of thirty-six vamps, more or less, depending on the size of the case, will be composed of a wide range of sizes but will ordinarily be of a single style. It is necessary, therefore, for an operator who desires to prepare these vamps by machine for the tip stitchers and the vampers to change the setting of the machine for practically every vamp according to its size. The machines and devices heretofore proposed have, moreover, usually required that such settings be made manually, the various parts requiring such adjustment commonly being held in position by set screws. It will be very plain, therefore, that the use of such apparatus must necessarily be relatively slow and laborious.

With a view to obviating such disadvantages, a further object of the invention is to devise an improved machine organization for preparing vamps by means of which the setting of the various parts is accomplished by power-operated mechanism. As illustrated, this mechanism is set in motion simply by the depression of a starting key by the operator.

In general, the preferred organization comprises a work-supporting table, adjustable gages whereby the work is positioned on the table, adjustable marking devices movable toward and away from the work, adjustable skiving mechanism for trimming the forward end of the work, mechanism for applying a reinforcing tab to the under side of the work, power-operated mechanism for controlling and operating the parts, and manually operable keys and levers to control the machine. According to the preferred embodiment, a plurality of operating keys for starting the machine is provided, and each of these keys corresponds to a particular size of vamp. Assuming then that the machine has been adjusted for the style of vamp to be treated, it becomes necessary only for the operator to place any particular vamp upon the machine and to press an operating key corresponding to the size of the vamp in question. Adjustment for this size of vamp, effected by power, is then followed immediately by the automatic performance of the various operations for which the machine is arranged.

The difference between the distance from the throat of a vamp to its tip seam of any one style, as found in the smallest vamp, and that distance in the largest vamp, is substantially constant and differs only slightly in the various factories. In some factories, the difference in this measurement between adjacent sizes may be a sixteenth of an inch, while in another factory it may be only a twentieth of an inch, but in all the factories, the total variation between this measurement for the smallest and the largest size is relatively constant. On the other hand, on account of the difference in styles of shoes and the difference between vamps for blucher shoes and those intended for Balmoral shoes, there may be a very considerable variation between the distance from the throat to the tip seam in the smallest size of a short vamp style and the distance from the throat to the tip seam in the largest size of a long vamp style. To make a machine which would accommodate this total variation would render the same clumsy and inconvenient.

To meet these conditions, one of the features of the invention consists in an organization such that simply the initial adjustment of a single style lever will adjust the connections between the operating shaft and those levers which determine the position of the various setting and gaging mechanisms in accordance with the style of the vamp to be operated upon. With such an arrangement it is possible to design the machine so that the total range in movement need only be approximately that of the total difference between the smallest and largest distances of the tip seam from the throat, resulting from the range of sizes. Preferably a table will be supplied with the machine so that the operator may readily determine the proper setting of the style lever as each bundle of vamps is taken up for work.

In accordance with another feature of the invention, a plurality of marking devices are adjustably mounted on a marking head which is movable toward and away from the work. In the preferred embodiment, these marking devices comprise a tip marker useful for all classes of vamps and blucher markers which are used to mark points to indicate the position of attachment of the quarters of a blucher shoe. The tip marker is adjustable with respect to the marking head in accordance with various characteristics of the work such as its size, style, and use in a right or left shoe. It is loosely supported upon the head and brought up to the work by movement of the head after which additional pressure is applied to force the marker into the work. The blucher markers are mounted for symmetrical movement with respect to the head and the machine is arranged so that they are moved by resilient means until they contact with the adjustable gages which are used to position the work on the machine.

After the toe cap or tip has been sewed to the vamp along the line of the marks already applied, there would, according to the old system, be a slight amount of surplus material on the vamp, projecting forwardly of the tip seam on the inside of the shoe. It has been customary to remove this manually as a separate trimming operation. Still another feature of the invention, therefore, resides in a machine arranged automatically to trim this surplus material from the forward end of the vamp while the vamp is clamped in position for the other operations noted. Preferably the arrangement is such that the skiving or trimming commences at a fixed distance from the tip seam and, in the preferred embodiment of the machine, the arrangement is such that the cutting commences at a fixed distance from the tip marker regardless of the size or style of the vamp.

In another aspect, the invention provides a novel method of scarfing leather in the practice of which, as herein exemplified, a continuous, smooth scarf is produced by means of a succession of cuts as the knife moves in a zigzag course along the path of the cut. Preferably, the cutting action is confined to the movements of the knife toward one side of the work while movements toward the other side are parallel to the cutting edge so that they are noneffective in so far as cutting action is concerned.

In the use of a reinforcing tab applied to the under side of a vamp, difficulty has been experienced for two reasons. In the first place, if the tab is only secured by means of paste, as is customary, then there is considerable danger of its being lost prior to the time when the vamp is stitched to the quarters by the vamping operation. In the second place, if, as has been a frequent practice, the application of the reinforcing tab is delayed until after the quarters have been laced, considerable difficulty results when the operator attempts to attach a tab after the quarters of the shoe have been tied together. This has been, moreover, a separate operation which has been performed by hand with less care than is desirable and which has added appreciably to the cost of assembling the upper.

In one aspect, the invention provides a novel method of applying and securing a reinforcement tab in the practice of which, as herein exemplified, a tab is severed from an elongated strip of reinforcing material and temporarily secured in place by applying paste to the end of the strip and then more firmly held in position by placing a piece of adhesive paper over and surrounding the leather tab and causing said paper to adhere directly to the vamp. After the reinforcing tab has been secured in position by means of stitching, the gummed tissue paper may obviously be removed if desired.

Considered from another standpoint, to the same end, the invention provides an improved machine having, as a feature of the invention, novel means for applying this tab, in accordance with my novel method, automatically and accurately to a vamp. According to the preferred embodiment of the invention, this part of the work of preparation is carried on while the vamp is held in accurate position in a machine which performs other steps in the preparation of the vamp, thus securing the double advantage of an accurate placing of the tab and a reduction in the cost of assembling the shoe by eliminating the tab securing as a separate operation.

For a more complete understanding of the preferred embodiment of the invention, reference is had to the accompanying drawings, in which:

Fig. 2 is a side elevation with the casing broken away at the rear and certain parts shown in section;

Fig. 3 is a longitudinal section through the center of the forward part of the marking head;

Fig. 4 is a transverse, vertical section through the machine adjacent to the operating keys;

Fig. 5 is part of a longitudinal section of the machine taken near the front end;

Fig. 8 is a transverse, vertical section on the line 8—8 in Fig. 1;

Fig. 9 is a longitudinal, vertical section on the line 9—9 in Fig. 8;

Fig. 10 is a longitudinal, vertical section on the line 10—10 in Fig. 8;

Fig. 11 is a vertical, transverse section along the line 11—11 in Fig. 1;

Fig. 12 is a detail view in elevation showing the adhesive strip moistening device;

Fig. 13 is a detail view of the mechanism for feeding the adhesive strip;

Fig. 14 is a vertical section along the line 14—14 in Fig. 1;

Fig. 15 is a vertical section, enlarged, showing the cams and operating levers for the reinforcement applying devices;

Fig. 16 is a section on the line 16—16 of Fig. 2;

Fig. 17 is a plan view of the reinforcement applying mechanism shown in Fig. 12;

Fig. 18 is a view similar to Fig. 12 with the parts in a different position;

Fig. 19 is a horizontal section on the line 19—19 in Fig. 12;

Figs. 20 to 22 show different styles of vamps and indicate by dotted lines the position of the tip seam in various cases; and Fig. 23 is a longitudinal section through the throat of a vamp after it has been prepared by the machine for incorporation in an upper.

Figure 1:
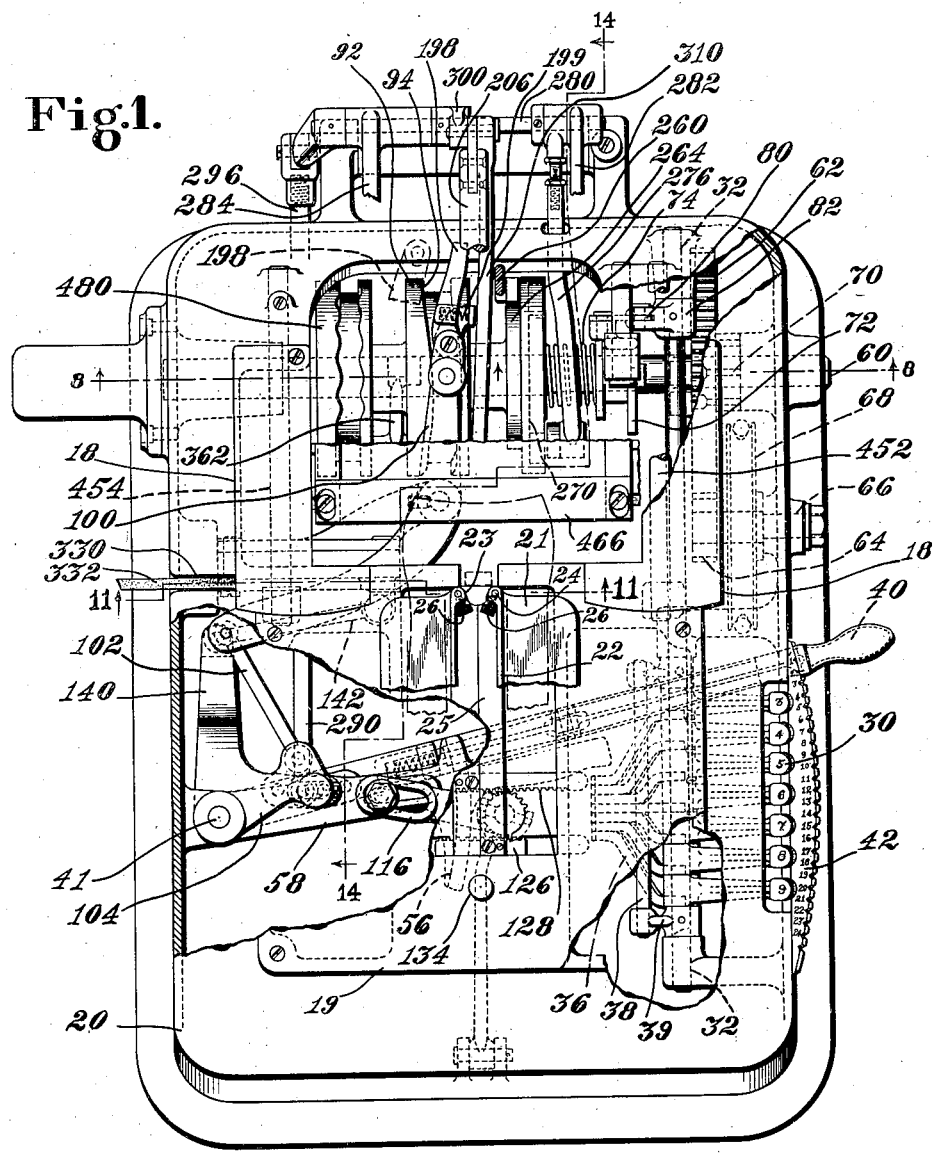
Fig. 1 is a plan view with parts of the cover and the marking head broken away.
Figure 6:
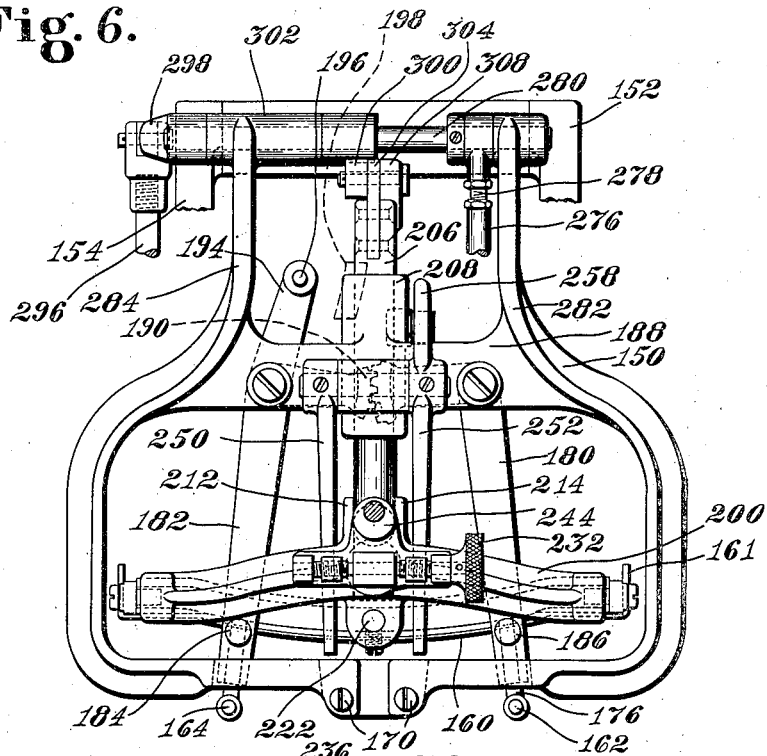
Fig. 6 is a plan view of the marking head in its depressed position.
Figure 7:
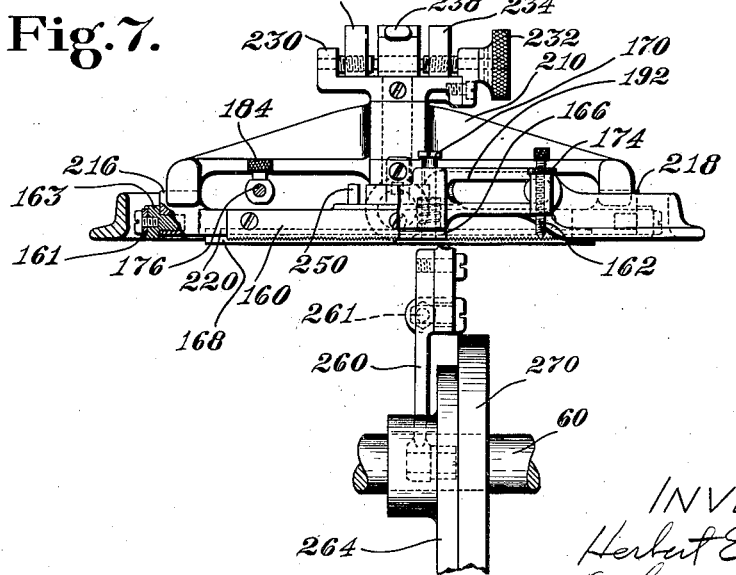
Fig. 7 is a front elevation of the same with one side broken away.

The illustrated machine has been particularly designed to prepare shoe vamps by applying a linear mark to indicate the position of the tip seam, skiving the surplus material forward of said tip seam, applying marks to indicate the points of attachment of the quarters in the case of a blucher vamp, and applying a reinforcement tab to the lower surface of the vamp adjacent to its throat. In general arrangement, the machine comprises a casing whose flat top surface serves as a work-supporting table. Projecting upwardly from this table are work-positioning pins which are separated a greater or less distance in accordance with the size of the vamp and these pins assist the operator in positioning the work when the work is placed so that the throat of the vamp at its deepest part contacts with said pins. A marking head is pivoted at the rear of the machine to swing up and down and this head carries marking tools and an adjustable abutment to co-operate with the skiving knife. After the work has been positioned, the head is brought down and clamps the forward part of the vamp and the tools are pressed against the work to apply the required marks. Located substantially in the plane of the table is a transversely disposed skiving knife, which is arranged to be moved away from the operator, toward the adjustable abutment on the movable head, to skive the further end of the vamp so as to remove surplus material beyond the tip seam. The adjustment of the gages and of the various parts upon the movable head is effected by power-operated means, the effect of which is determined by means of a movable stop which the operator brings into position by the depression of an operating key, which is also constructed and arranged to connect the clutch to start the operation of the machine. Mechanism for applying the reinforcement tab is located beneath the table and is actuated substantially simultaneously with the marking and skiving mechanism to apply adhesive to the end of a strip of reinforcement leather, to feed the strip into position to cut off a piece of it, to push it into engagement with the under side of the work, and then to paste over the leather tab a temporary, protective covering of paper. Two other manually adjustable devices are provided, which may or may not need to be moved upon the presentation of a particular piece of work. One of these is a so-called angling lever for adjusting the tip marker to compensate for the "swing" of a crooked last accordingly as the vamp is for a right or left shoe. The other is a so-called style lever, which needs only to be adjusted when changing the character of work being presented to the machine, as, for example, when changing from short vamps to long vamps. The general effect of this lever is to adjust the mechanism connecting various parts of the machine so as to bring the range of sizes for any particular style of vamp within the range of adjustment of the machine.

The mechanism is largely enclosed within a casing 20 (Fig. 2) whose top surface slopes forwardly to make the work more readily visible to the operator. Mounted on the upper surface of the top of the casing are two similar work-supporting plates 21 (Figs. 1 and 4) brazed to upright ribs 22 (Fig. 1), which terminate at their forward ends in substantially cylindrical gages 23 adapted to determine the position of the corners of the throat of a vamp placed in the machine, as indicated in Figs. 19 to 22. The gages 23 are pivotally supported on pins 24 rising from narrow longitudinal plates 25, best shown in Fig. 1, and thumb screws 26 are provided to hold the adjusted position of the gages on the pins. Operating keys 30 are located at the right of the machine and are arranged in a manner which will be later more fully described, so that the operator may depress a key corresponding to the size of the particular vamp which is to be operated upon, to set the machine in motion.

A style lever 40 is pivoted on a vertical pin 41 and has attached to its upper surface a pawl or latch member 44 (Fig. 4) whose outer end lies immediately over the handle of the lever 40 and is held separated therefrom by means of a spring 45. The latch 44 has a projection 46 adapted to engage the notches in a segment 42 (Fig. 1). The inner end of the latch 44 is normally received between and protected by upstanding lugs 47 (Fig. 4) but when it is elevated, it is adapted to enter a recess in the lower side of an arm 50 pivoted loosely upon the pin 41. Within this recess is a spring-pressed plunger 52 having a depending lip 54 which is adapted to be engaged by the sloping end of the latch 44 and pushed back to leave the arm 50 free for adjustment with the style lever 40. The plunger 52 acts as a clutch to connect the arm 50 in any desired position to a segment 56 formed on a setting lever 58. This setting lever 58 is loosely pivoted on the pin 41 and is arranged, as later explained, to set the gages 23 and determine the initial position of the tip marker and the skiving knife. It should be noted that the return of the arm 104 of the bell crank lever (shown at the upper left-hand corner of Fig. 4), as the cycle of the machine is completed, serves to drag back to a fixed starting position the setting lever 58 and the parts connected with it, to wit, the work-positioning gages, the marking devices, the abutments for the skiving knife, and the carriage supporting the reinforcement-applying mechanism. It is for this reason that the recess in the lower side of the arm 50 is always brought to a position vertically above the end of the latch 44 so that it is ready to be engaged thereby in case it is desired to change the setting of the style lever.

On reference to Figs. 1 and 4, it will be seen that each of the operating keys 30 is pivotally mounted upon a rod 32 and has its outer end normally held in its upper position by means of a corresponding spring 33. Stop members 36 (Fig. 4) are rigidly mounted in recesses formed in lugs depending from the hub of each key 30 and have, adjacent to their central portions, upwardly extending projections 37 arranged to engage and elevate the rod 38 supported by arms 39 pinned to the rod 32, thus rotating said rod 32 in a clockwise direction. From an inspection of Fig. 1 it will be observed that the various stop members, although relatively widely separated at their outer ends, are bent inwardly at their inner ends to lie closely adjacent to one another so that there is a comparatively fine adjustment of the effective point of contact of the stop. The depression of any key will rotate the rod 32 to start the machine as next described but elevates a stop 36 located in a different position from that attached to any other key.

In addition to the functions which have already been assigned to them, the operating keys 30 serve to connect the driving shaft of the machine to the source of power, and this takes place whenever any key is depressed as the rod 32 is rotated in a clockwise direction by the engagement of a projection 37 on the corresponding stop to lift the bar 38 mounted in arms secured on said rod 32. The main shaft 60 of the machine is provided with a gear 62 loosely mounted on said shaft meshing with a smaller gear 64 mounted on a stub shaft 66, which is also provided with a driving pulley 68 by means of which the machine may be driven from any suitable source of power. The connection between the shaft 60 and its gear 62 is effected by a clutch 70 of any suitable construction and here shown as having a plurality of pins on the driven gear 62 and one or more pins 89 on a spool-shaped collar 72. This collar is loosely mounted on said shaft and normally pressed to the right by means of a spring 74 to cause the engagement of the parts of the clutch. A lever 76 depending from a stud 78 mounted in the casing at the rear of the machine (Figs. 2 and 4) is provided at its lower end with a roll designed to enter the recess of said collar 72 and when swung to the left, as viewed in Fig. 4, to hold the clutch in disconnected position in opposition to the spring 74. A toggle comprising links 80 and 82 extends between a pin 84 upon said lever and the rod 32 and the link 82 is pinned to the rod 32. Consequently when rod 32 is rotated, it lifts the joint of the toggle and thereby breaks it to allow the spring 74 to force the clutch into engagement. The frame of the machine is provided (see Figs. 2 and 4) with a lug 86 extending forward from the inside of the rear end of the casing. This lug is provided with a roll 88 adapted to engage a cam surface 90 upon the lateral face of the spool collar 72. The cam surface is so designed that when the shaft has completed a single rotation, the spool collar 72 is forced to the left against the tension of the spring 74 sufficiently far to allow the toggle 80, 82 to fall into a straight line position, and at this time the roll 88 passes a shoulder in the cam 90 so that when the toggle is again broken, the spring 74 will be effective to connect the shaft of the machine with the driving motor. Obviously then the depression of any one of the operating keys 30 will lift the bar 38, rotate the rod 32, break the toggle, and set the machine in operation, which will be continued for one complete revolution of the main shaft and then stop. The use of the springs 33 to elevate the individual operating keys makes it necessary for the operator to hold depressed a key which has been used to set and start the machine until the cycle of the machine has been substantially completed, at least until the end of the setting lever 58 has engaged the particular stop elevated by the depression of the key. The speed of operation of the machine, however, is such that only a very short time is required for the completion of its cycle so that this period is hardly noticeable in the use of the machine.

Cams for controlling the various pieces of mechanism are mounted on the main shaft 60. One of these cams 92 (Fig. 1) is provided with a cam track 94 (known as the "tip-locating cam") upon its peripheral surface which is traversed by the roller on a lever 100. The movements of this lever cause the setting of the gages 23, movement of the knife 466 and the tip marker 160 to their initial positions in accordance with the size and style of the vamp, and, coincidently, the sliding of the carriage 144 which supports the reinforcement applying mechanism. The lever 100, which is mounted to swing about a vertical pivot, is connected (see Figs. 1 and 14) by means of a link 102 with the extremity of one arm 104 of a bell crank lever which is loosely pivoted upon the vertical pin 41. At the end of this arm there is provided a spring-pressed plunger 106 (Fig. 4), limited in its downward movement by a screw 108, and this plunger is adapted to engage a recess in a plate 110 attached to the upper surface of the setting lever 58. The arrangement is such that the lever 100, actuated by its cam, swings the setting lever 58 and the attached mechanism until the outer end of said lever, moving in a clockwise direction as viewed in Fig. 1, contacts with the particular one of the stops 36 which has been elevated by the depression of an operating key 30. The ultimate position of the setting lever 58 is thereby directly dependent upon that one of the operating keys which is depressed, and this corresponds to the size of the vamp to be operated upon.

As the machines are set up for use in various factories, various systems of size grading will be encountered and slots 112 and 116 have been provided to allow adjustment to adapt the machine to any particular system. The setting lever 58 is slotted at 112 to provide room for the adjustment of a stud 114 surrounded by a suitable bushing, and this bushing is arranged to slide in the slot 116 in a lever 118 which is loosely supported upon a vertical shaft 120 by means of a set screw 122 engaging a groove therein.

For moving the throat gages 23 laterally to fit and accurately to position vamps of different sizes, the shaft 120 is provided with a pinion 124 at its upper end by means of which it is supported in the frame of the machine, and this pinion engages racks 126 and 128 which are attached to the narrow longitudinal plates 25 supporting the right and left hand gages 23 and arranged to move said plates with their gages 23 laterally under the influence of the pinion 124. The vertical shaft 120 is connected to the arm 118 by means of a cone clutch 130 held normally in engagement by a spring 132. The clutch 130 is capable of being pressed out of engagement to disconnect the lever 118 from the pinion 124 by means of a button 134 (Fig. 5) extending through the cover of the machine and acting through a lever 136, one end of which is pivoted to the casing and the other end of which is forked to engage a groove in said cone clutch 130. The button 134 is intended as an emergency device to prevent injury to the vamp in case the setting of the machine is such as to cause too wide a separation of the gage pins 23 within the throat of the vamp.

The instrumentalities for applying location marks to indicate the position on the vamp where a tip (and quarters in case of a blucher vamp as at c, Fig. 21) will be attached, are carried on a marking head 150 mounted to swing up and down, which is best seen by an inspection of Figs. 2, 3, 6, 7 and 16. This head is pivotally supported by means of brackets 152 and 154 (Figs. 2 and 6) extending rearwardly from the back end of the casing and carries a serrated blade 160, which is adapted to be pressed into the forward part of the vamp to indicate the line for the attachment of the tip or toe cap of the shoe, markers 162 and 164 for use in the case of blucher vamps to indicate the point of attachment of the quarters, a presser member 166 to hold the work against the table of the machine and an abutment 168 designed to co-operate with a skiving knife in a manner to be later described. The presser member 166 is mounted upon pins 170 and urged downwardly by means of springs 172 resiliently to engage the upper surface of the work near the throat and hold it against the table as shown in Fig. 10.

The blucher marking points 162 and 164 are formed as screws provided with locking nuts 174 and threaded in the T-shaped outer ends of fingers 176 which are adjustably held in position at the ends of arms 180 and 182 by means of set screws 184 and 186. This adjustment of the points in the arms is chiefly of use when the machine is being set up but may be useful when different styles of blucher vamps are to be treated. The arms 180 and 182 are pivoted upon a cross-bar 188 in the head 150 and are provided with intermeshing segments 190 so that the blucher markers are always maintained in positions equidistant from the center of the marking head. The forward ends of the arms extend through slots 192 in the forward cross-bar of the marking head and are supported against deflection in a vertical direction by the sides of said slots. Obviously the correct position of said blucher markers 162 and 164 relative to the center of the vamp must depend upon the size of the vamp. In order that this position may be determined automatically in the operation of the machine, the arm 182 is provided with a rearward extension 194 having a depending pin 196 adapted to engage a finger 198 (see Figs. 1 and 14), which is pivotally mounted upon the end of the lever 100 and is resiliently held in position by means of a spring 199. In operation, the sides of the T-shaped ends of the fingers 176 will engage the sides of the gages 23 and this will determine their correct position. The spring 199 allows the completion of the movement of the lever 100 on which the finger 198 is mounted.

The tip marker 160 must be adjusted upon the marking head for rights and lefts and to correspond with the size of the vamp. To this end, the tip marker 160 and the abutment 168 are carried upon a transverse frame 200 of the marking head which in turn is pivoted upon a vertical stud 202 pinned at 204 to a slide 206 supported by means of a bearing sleeve 208 formed in the transverse head member 188 and adapted to be moved from front to rear in accordance with the size and style of the vamp being operated upon. The transverse frame 200 is made up of an upper member 210 provided with ears 212 and 214 and notched at its outer ends to receive the ribs 216 and 218 upon the outer ends of a lower member 220. The member 220 (see Fig. 3) is provided with an upwardly extending pin 222 at its center by means of which it is connected to the upper member 210 and held therein with a set screw 224. The tip marker 160 is secured by screws to the front edge of a curved plate 161 held by screws in grooves in the heads of studs 163 pivoted in the lower member 220 (see Fig. 7 where it is broken away at the left). The abutment 168 having a sloping lower surface is also secured to this lower component part 220.

To swing the transverse frame 200 around the vertical stud 202 in order to position the tip marker and the skiving abutment for right or left hand shoes, a forked member 230 is secured to the upper end of the vertical stud 202 and is provided with a right and left screw 232 carrying abutments 234 and 236 for limiting the movements of an angling handle 238. This handle is secured to the upper end of a stud 240 pivotally mounted in a bearing 242 secured to the upright 202, and the stud 240 carries at its lower end an eccentric 244 adapted to engage the ears 212 and 214. An additional slight downward movement of the tip marker 160, to force the serrated edge thereof into the work after the edge has been brought to a position adjacent to the work by the lowering of the marking head 150, is secured by means of fingers 250 and 252 which are rigidly secured to a transverse rod 254 pivoted in an upward extension 256 of the transverse member 188 of the frame of the marking head. The finger 252 is provided with a rearward extension 258 which drops downwardly and has connected to its lower end an arm 260 (Figs. 2 and 7) bearing a roll 262 adapted to engage the peripheral surface of a cam 264 upon the main shaft 60 of the machine. A screw 261 is provided to allow adjustment of the position of the arm 260 with respect to the extension 258. This cam is so designed that at an appropriate time in the latter part of the cycle of the machine the forward ends of the arms 250 and 252 will be forced against the lower member 220 of the transverse frame 200 and, in turn, force the serrations of the tip marker 160 into the work.

Actuation of the marking head 150, to bring it down against the work and subsequently to lift it after the machine has finished its work, is secured by means of a cam 270 (Figs. 1 and 14), having a lateral cam path 272, working through a lever 274 and a rod 276 adjustably connected by means of a threaded member 278 to the transverse rod 280 (Figs. 6 and 16) mounted between the arms 282 and 284 of the marking head. The design of the cam path is such that, at the very beginning of the operation of the machine, the head 150 is brought substantially to the limit of its movement and almost but not quite far enough to cause the clamping member 166 resiliently to engage the work. At a later period after the so-called tip locating cam 94 has completed its work, the cam path 272 depresses the head 150 slightly more to a final position adjacent to the table of the machine, thereby clamping the work and bringing the sloping abutment 168 into position for co-operation with the skiving knife in a manner to be later explained. Actuation of the slide 206, in accordance with the size and style of the vamp, is effected through the agency of a rod 290 adjustably connected at any one of a plurality of points 292 (Fig. 4) to the arm 50 in accordance with the variations of grading between adjacent sizes in the different systems of sizing in use in shoe factories. This rod 290 is jointed at 294 (Fig. 14) to another rod 296 supported in bearings in the frame of the machine and connected at its rear end to a lever 298 (Fig. 16) pinned to the transverse shaft 280 in the marking head. A lever 300 is also pinned to this shaft 280 and positioned laterally thereon by means of a boss 302 formed on the arm 284 and surrounding the shaft 280. The upper end of the lever 300 is pivotally connected to a depending plate 304 secured in a slot in the rear end of the slide 206. Loosely secured to this same pin 306, at the upper end of the lever 300, is the slotted end 308 of a rod 310 (Figs. 1, 2, 8 and 14) which is connected to the upper end of an arm 312 clamped upon a transverse shaft 320 pivoted in the frame of the machine. This transverse shaft supports the carriage for the skiving knife in a manner to be later explained.

In order to strengthen the vamp at the throat, a reinforcement of leather, which may, for example, be approximately one-half of an inch wide and one inch long, is secured to the lower surface of the vamp adjacent to the throat and, as has been previously stated, the mechanism for carrying out this operation is mounted on a carriage 144 and is shown in Figs. 11, 12, 13, 15, 17, 18 and 19. The carriage 144 is supported upon rollers 146 in a guideway 148 rigidly attached to the frame of the machine and allows the transference of substantially the whole mechanism from the position where it picks up a piece of leather reinforcement to a position immediately below the center of the throat of the vamp. The cover of the machine is provided with a transverse depression 330 (Figs. 1 and 11) to serve as a guide for the supply strip of leather reinforcing material 332. Adjacent to its inner end, this groove is deepened and is covered by means of a trough-like member 334, which is provided with sides and is suspended from the cover of the machine to provide a receptacle for paste. The inner end of said trough is provided with a ball valve 336 resiliently held in position to close an opening in the lower side of the trough but adapted to be displaced to allow a small quantity of paste to flow out upon the leather strip. A cutting block 338 is also mounted on the lower edge of this trough. The outer end of the carriage 144 is shaped to form a bearing 340 for a series of concentrically arranged members, the innermost of which is a plunger 342 provided with a screw extension 343 having a flat head adapted to press the leather reinforcement against the valve 336 and apply a small quantity of paste to the surface thereof. This plunger is surrounded by a die sleeve 344, the upper end of which is formed as a cutting die 346, and said sleeve is resiliently maintained in position near the head of the plunger by means of a spring 348. Surrounding the die sleeve 344 is a presser sleeve 350, whose movement with respect to the die sleeve is limited by means of a screw 352 working in a slot in the presser sleeve, and which is normally maintained with its upper end above the cutting die 346 by means of a spring 354 interposed between said sleeves. The sleeve 350 contacts directly with and is supported by the bearing 340 and is provided with ears 351 (Fig. 17) to prevent its rotation in the bearing. The plunger 342 and the surrounding sleeves are actuated by means of a lever 362 pivotally supported upon the transverse shaft 320 by means of a hub member 364, said lever having a roll at its rear end engaging a cam track 360 cut in the lateral face of the cam 92. The lever is provided with a forward end portion (best illustrated in Figs. 11 and 15) comprising a transverse flange 366 and a vertical flange 368. It will be noted from an inspection of Fig. 11 that a depression 370 is provided in the transverse flange 366 and that the vertical flange 368 extends across only a portion of the end of the lever. The plunger 342 and its surrounding sleeve 344 assume three different positions (Fig. 11) above the end of said lever which are indicated by dot and dash lines 372, 374 and 376. Movement of the carriage 144 to bring the plunger to these positions is imparted through a rod 142 (Figs. 1 and 14) from an arm 140 of a bell crank lever 104 on the stud 41, which is positively moved by the tip locating lever 100. When the plunger is in the first of these positions, the lever 362 is actuated to elevate the plunger to apply paste to the reinforcement and to force the edge of the die 346 part way through the leather. It is held in this position so the edge of the die 346 drags along the strip 332 while the carriage 144 is being moved laterally to bring the center of the plunger opposite the second position 374. When in the second position 374, the cam path 360 is so shaped as to cause the forward end of the lever 362 to be slightly elevated and then depressed, the extent of the movement being such that the vertical flange 368 forces the die sleeve 344 upwardly to cause the cutting edge 346 to contact with the cutting block 338 and to sever the reinforcement from the strip which has been pulled forward during movement of the carriage 144. It will be noted that the slight upward movement of the lever 362 to cut off the reinforcement does not unduly elevate the plunger 342 because of the relieving recess 370 (Figs. 11 and 15) in the flange 366. The tab which has been cut off will rest upon the outer presser sleeve 350 and be carried along by contact with the cutting edge 344. When the sliding carriage 144 has been moved to the third position 376, the cam path 360 is so shaped that it forces the plunger 342 upwardly to press the reinforcement tab 550 (Figs. 20 and 23) against the lower surface of the vamp, where it is temporarily held by the paste which has been applied. It will be noted that the springs 348 and 354 interposed between the concentric sleeves will act at this time to carry along the die sleeve 344 and the surrounding presser sleeve 350, which have assisted in holding the reinforcement in position over the plunger. The cam path 360 is then shaped to cause the recession of the plunger and its surrounding sleeves to allow the interposition of a piece of adhesive paper such as gummed tissue, whereupon the cam path again forces the lever 362 to raise the plunger and its sleeves and attaches a temporary protective covering of paper 560 over the reinforcement tab 550 more securely to retain it in position.

The mechanism for serving, moistening and cutting off a section of the strip 562 of adhesive paper is mounted on the carriage 144 and is best illustrated in Figs. 12, 13, 15, 17, 18 and 19. It includes a chamber closed by a pivoted door 380 which is locked in position by means of a latch 382, said chamber holding a roll made up of a strip 562 of gummed tissue paper. A receptacle 384 is provided in the upper portion of the metal forming the paper chamber and supplies water to an applying device comprising a finger piece 386 mounted upon the outer end of a bell crank lever 388 pivoted at 390 to the carriage 144. The lower end of the bell crank lever is attached by means of a link 392 to a rod 400, whose reduced upper end is slidably received in a recess in the block 340 and is cross connected by a clamp 401 (Fig. 19) to a plunger 403 which is guided in a suitable bearing formed in the block 340 and is provided at its upper end with a strip feeding mechanism illustrated in Fig. 13. A spring 402 acts to hold the rod 400 and the connected mechanism in lower position. Co-operating with the rod 400 is a lever 404 actuated from a cam path 406 cut in the other lateral face of the cam 92 on the main shaft. This cam path is so shaped that at a suitable point in the operation of the machine, namely, after the cam shaft has made approximately one-half a revolution and the leather tab 550 has been stuck to the vamp, it will elevate the plunger 400 to actuate the mechanism in conjunction with the die mechanism carried by the plunger 342 so as to feed a strip 562 of gummed paper into position over the top of the plunger 342 (Fig. 18) to moisten it, to cut it off, and to allow it to be applied to the lower surface of the vamp, as above described. The paper strip feeding mechanism comprises a roll 410 (Fig. 13) fixed on a sleeve surrounding a shaft 420 pivotally mounted in a head 412 formed on the upper end of the plunger 400. The shaft 420 is provided at one end with an arm 414 carrying a pawl 416 adapted to engage the teeth of a ratchet 418. It will be noted that the ratchet 418 is attached to the sleeve to which the roll 410 is also attached while the arm 414 is pinned to the shaft itself. At the other end of the shaft 420 is fixed an arm 422 provided with a roller adapted to be received in a slot 424 (Figs. 12 and 13) formed in a plate 426 attached to the carriage 144. It will be noted that the lower end of the slot 424 is abruptly curved. When, therefore, the plunger 400 is elevated with respect to the carriage 144, the slot 424 will be shaped so that in the first half of the upward movement a strip of paper will be fed upwardly between the head 412 and the cap plate 428. Substantially at the same time, the bell crank lever 388 will bring the moistening finger 386 over the gummed surface of the extended strip and beyond the die plunger 342. Cam path 360 is then so shaped that it causes the presser sleeve 350 to pass the plunger 400 and the coacting edges 430 shear off the piece 560 of moistened, gummed tissue so that it may be carried up by means of the plunger 342 and the presser sleeve 350 and applied to the lower surface of the vamp (see Figs. 20 and 23). The plungers are then allowed to recede, during which movement the retaining pawl 432 prevents the ratchet from rotating in the reverse direction and allows the parts to return to their original position without disturbing the position of the unused end of the gummed tissue.

The mechanism for skiving the forward end of the vamp to remove the excess leather forward of the tip seam is best illustrated in Figs. 8, 9 and 10 and comprises a knife carriage 450 mounted to slide lengthwise of the machine upon rods 452 and 454 which are mounted in the frame of the machine, said knife carriage being made up of side members 455 and 456 in which slides a knife-carrying frame 460 comprising a central strut 462 and trapezoidal end members 463 secured by gibs 464. The side members of the knife carriage are connected by arms 470 and 472 to the transverse rock shaft 320 to which said arms are rigidly clamped so that the carriage partakes of the movements of the rock shaft as transmitted to it by the rod 310 and the arm 312. A skiving knife 466 is adjustably attached (see Fig. 1) by screws to the carrying frame 460, and means are provided for oscillating the knife transversely of the knife carriage, as the carriage moves forward, to skive the vamp. This oscillating mechanism comprises a cam track 474 cut in the peripheral face of a cam 480 mounted on the shaft 60. A lever 476 pivoted to the frame at its lower end is provided with a roller 478 (Fig. 8) engaging the cam track 474 and is forked at the upper end to engage a rod 482 mounted in depending ears 484 formed on the transverse carriage 460.

The movement of the knife carriage 450 to the rear of the machine, which is effected by means of the rods 290 and 296 (Figs. 1, 14 and 16), the lever 298, 300 and thence through the link and lever connection 310 and 312 to the shaft 320 is only a preliminary positioning movement, and the actual movement of the knife to skive the vamp is effected by means of a cam track 490 (Fig. 9) cut in the lateral face of the cam 480. Co-operating with this cam track is a lever 492 pivotally mounted on the rock shaft 320 and provided with a roller to engage the cam track. The connection of this lever to the knife carriage is effected by means of a clutch dog 494 normally held out of engagement with the serrated lower edge of the end member 456 by a spring 496 but forced into engagement therewith, at whatever initial position the carriage has assumed, by means of a cam 498 formed upon one side of the peripheral face of the cam member 480. It will be observed that the clutch member 494 is pivotally mounted upon a stud 500 received in a socket in the outer end of the lever 492 and normally held outwardly by a spring 502 to the limit of its movement, as determined by a pin 504 engaging a slot in said lever. A spring 506 surrounds the rod 454 and provides a buffer for the knife carriage and assists in the return of the knife carriage to its initial position. It should be observed that the abutment 168 on the marking head, having also been positioned by the setting lever, co-operates with the skiving knife in a manner illustrated in Fig. 10, so that the skiving knife moves forward in a fixed plane intersecting the plane of the face of the abutment 168 extended and cuts through the leather at an angle to form a skived edge of the usual character as indicated at 580 in Figs. 20 and 23.

The cam tracks 474 and 490 for oscillating and advancing the knife are so designed that they become effective after the cam 272 has completed its work of moving the marking head toward the table and the cam track 94 has completed its work of locating the gages and determining the initial position of the slide 206 which carries the abutment 168. It will be remembered that this also determines the initial position of the knife carriage so that when the cam tracks 490 and 474 begin to function, the relative positions of the knife 466 and the abutment 168 are as shown in Fig. 10 and always in a predetermined relation to the tip marker 160. The cam tracks 490 and 474 then produce a compound movement of the knife itself such that the knife moves forward in a zigzag line. The effective cutting movements in this zigzag motion will be along lines angularly related with respect to both the longitudinal and the transverse axes of the machine and the other oscillating movements to return the knife carrying frame to the opposite side of the machine will be along lines parallel to the transverse axis of the machine and will do no cutting.

The work of the machine will be better understood from an inspection of the illustrations in Figs. 20 to 23, from which it will be seen that the machine is intended to apply a line of dots 570 across the forward end of the vamp to indicate the position for the attachment of the tip or toe cap. At the same time the machine skives the under side of the forward end of the vamp at 580 to remove any surplus material forward of said tip seam and in a predetermined relation to the tip seam. In blucher vamps 530, such as are illustrated in Fig. 21, the marking points 162 and 164 will also be used to apply marks to indicate the position $d$ of attachment for the forward end of a quarter $e$, such as is indicated in dotted lines, while the tip seam will be marked to indicate the position for attachment of a tip $c$. The position of the reinforcement tab 550 and its protective covering 560 adjacent to the throat and on the under side of the vamp is indicated in dotted lines in Fig. 20. The coaction of the positioning devices 22 and 23 with the throat of any style of vamp is also indicated in the various figures. It will be observed from Figs. 20 and 22 that the angle of the tip seam must be varied accordingly as the vamp is for a right or left shoe. In the case of blucher vamps the position of the blucher marks is in a fixed relation to the work-positioning gages but must be variably determined for each particular size of vamp. Similarly the distance from the throat and the work-positioning devices engaging the throat to the tip seam varies with the size of the work and also varies with the style of the vamp. Note, for example, the difference in this dimension in Figs. 20 and 21 in each of which the vamp shown is for the same size of shoe. In the case of a short vamp, such as that shown at 540 in Fig. 22, the angling handle 238 will enable the operator to apply the tip seam mark correctly so that the tip may be attached either in position $f$ or position $g$ accordingly as the shoe is a left or a right.

In the operation of the machine, the operator will select a vamp, such as the full vamp 520 for a Balmoral shoe indicated by dash lines in Fig. 1 and shown in Fig. 20, upon which the size had already been marked and will place the same upon the machine so that the throat contacts with the gage pins 23, and so that the lateral sides of the throat rest against the upright ribs 22. In case the vamp is to be used on a crooked last, the proper "swing" may be obtained by moving the angling handle 238 accordingly as the vamp is for a left or a right shoe as indicated at $a$ and $b$ in Fig. 20 or at $f$ and $g$ in Fig. 22. If necessary, the style lever 40 will be moved to the proper notch in the segment 42 so that the extreme movement of the various parts of the machine will be within the limits of the mechanism which is designed to take care of the extreme variations required by the differences in size between the smallest and the largest sized vamp in any particular style.

The operator will then depress the operating key 30, which corresponds upon the machine to the size of the vamp, and this will elevate one of the stop members 36 and will throw in the clutch to cause a single rotation of the main shaft 60. As the shaft begins to rotate, the marking head operating cam 272 and the die actuating cam track 360 in the cam member 92 will first begin to function and will be effective to bring the marking head 150 down so that the presser member 166 almost contacts with the surface of the vamp preparatory to holding it in position. At the same time, the plunger 342 of the reinforcement applying mechanism will be raised to cause the cutting die 346 partially to penetrate the strip of leather and to apply paste (by opening the ball check 336) to the upper surface of the end of the reinforcement strip resting in the groove 330. The tip locating cam track 94 then becomes effective to slide the carriage 144 to the right (Fig. 11) dragging along the reinforcement strip until the center of the plunger 342 coincides with the position indicated by the line 374 and also to rotate the setting lever 58 to a position determined by the particular stop member 36 which corresponds to whichever key 30 has been depressed. This movement of the setting lever 58 will open the gage members 23 to coincide with the size of the throat of the vamp and also will actuate the rod 290 thereby to move the marker carrying and abutment carrying slide 206 and the knife carriage 450 to an initial position already determined by the size of the vamp. Intermediate between the limits of the complete range of movement of the tip locating lever 100 under the influence of the cam track 94, a dwell is provided in said movement to allow the cam track 360 in cam 92 to actuate the lever 362 to force the cutting die 346 completely through the leather reinforcement strip against the cutting block 338 thereby severing the piece which is to be used. The cutting die 346 then recedes slightly and the tip locating lever 100 proceeds to complete its movement which results in moving the carriage 144 carrying with it the loose tab 550 to the third position 376 immediately below the center of the throat of the vamp and, if necessary, results in completing the movement of the gages, the marker carrying slide 206, and the knife carriage 450. This tab, termed "loose", which may have been produced as a detached piece of small size in various ways, is here formed by severing it from a supply strip, as described. After the setting lever 58 has come in contact with a stop member 36, the plunger 106 (Fig. 4) in the arm 104 of the bell crank lever which is connected to the tip locating lever 100 slips over the recess in the plate 110 to allow the completion of the movement of the carriage 144 regardless of the size of the vamp being operated upon. These movements completed, the marking-head-operating cam track 272 completes its work of bringing the head against the upper side of the vamp to clamp it, the knife operating and oscillating cam tracks 490 and 474 on cam 480 become effective to skive off the surplus material as at 580, and the die actuating lever 362 is again raised to push the reinforcing leather tab 550 into contact with the under side of the vamp immediately adjacent to its throat and exactly on the center line thereof. The paste which has been previously applied to the tab holds it in position upon the vamp, and the lever 362 recedes to lower the plunger and its surrounding sleeves and allow the paper feeding mechanism, under the control of the cam track 406 on cam 92 and the lever 404, to become effective. As the paper strip 562 is fed out and moistened by the fingers 386, the plunger 342, under the control of the lever 362, is again raised carrying with it the sleeve 350 to shear off the piece of adhesive paper 560 and apply it over the reinforcing tab to the under side of the vamp, the better to maintain the tab in position until the stitching of the various parts of the shoe securely holds it there. Approximately at the same time that the paper feeding mechanism starts to operate, the tip marking cam 264 becomes effective to force the serrated edge of the tip marker 160 against the work through the agency of the lever 260 and the arms 250 and 252 to make a linear dotted mark 570 across the vamp. After the work of the various parts has been completed, the cams return then to their original positions, and the spool collar 72 is forced to the left against the spring 74 to disconnect the clutch by reason of its engagement with the fixed roll 78 mounted on the frame.

Having thus described the invention, what I claim as new and desire to secure by Letters Patent of the United States is:—

1. In a machine for preparing shoe parts, mechanism adapted to be brought into engagement with a piece of work, power means constructed and arranged to move said mechanism directly to any one of a plurality of operative positions in accordance with a characteristic of the work to be operated upon, and means under the control of the operator for controlling the extent of the movement imparted by said power means.

2. In a machine for preparing shoe parts, mechanism for operating on work, members adjustable to position work to be operated upon relatively to said mechanism, mechanism for controlling the adjustment of said members adapted to be positioned in accordance with a characteristic of the work, power means for effecting the adjustment of said positioning members, and means under the control of the operator for positioning said controlling mechanism and controlling said power means.

3. In a machine for preparing shoe parts, adjustable instrumentalities for operating on work, adjustable members for positioning the work for the operation of said instrumentalities, mechanism for adjusting said members and instrumentalities in accordance with a characteristic of the work to be operated upon, power means for controlling said last-named mechanism, and means under the control of the operator for controlling said power means.

4. In a machine for preparing shoe parts, movable gages adapted to engage the throat of a vamp, an operating tool adapted to be applied to the surface of the vamp, and power-actuated means for variably determining the position with respect to the gages at which said tool will engage the work.

5. In a machine for preparing shoe parts, movable gages adapted to engage the throat of a vamp, an operating tool adapted to be adjustably positioned and to be applied to the surface of the vamp, and power-actuated means for determining the relative position of the gages and for adjusting the position of said tool.

6. In a machine for preparing shoe parts, mechanism for operating upon a piece of work, a plurality of operating keys, a gage adapted to determine the position of a piece of work, and mechanism set in motion by the actuation of an operating key for determining the position of said gage with respect to the operating mechanism.

7. In a machine for preparing shoe parts, mechanism for operating upon a piece of work, a plurality of controlling members, gages adapted to determine the position of a piece of work relatively to the operating mechanism, and power mechanism set in motion on the actuation of any selected controlling member for determining the position of said gages according to a characteristic of the work.

8. In a machine for preparing shoe parts, adjustably mounted mechanism for operating upon a piece of work, power means variably for adjusting said mechanism, and a plurality of controlling members, said controlling members being constructed and arranged to co-operate with said power means to determine the effect thereof in adjusting said operating mechanism and arranged to set said power means in operation when any one of said controlling members is actuated.

9. In a machine for preparing shoe parts, a plurality of controlling members one portion of each of which acts as a stop, adjustably mounted operating mechanism, and power-operated means for adjusting said mechanism operatively mounted for movement in the path of said stops, said controlling members being constructed and arranged so that the operation of any one of them is effective to set in motion said power mechanism and to position a stop to determine the limit of movement of a part of said power-operated adjusting mechanism.

10. In a machine for preparing shoe parts, a work support, movable gages thereon adapted to engage the throat of a vamp, an operating tool adapted to be applied to the surface of the vamp, and power-actuated means for determining the relative position of the gages and varying the position of said tool over the work support with respect to the gages while the tool is out of contact with the work thereby to determine the position at which it will contact with the work.

11. In a machine for preparing shoe parts, a plurality of operating keys, gages adapted to determine the position of a piece of work, and mechanism set in motion by the actuation of an operating key for determining the relative position of said gages.

12. In a machine for preparing shoe parts, movable gages adapted to determine the position of the throat of a vamp, power-operated means for adjusting said gages to a predetermined position, and emergency means for readily disconnecting said gages from the power-operated means.

13. In a machine for preparing shoe parts, movable gages for determining the position of a piece of work adapted to be moved to predetermined positions according to the size of the piece of work to be operated upon, a plurality of operating keys, and mechanism for moving said gages to a predetermined position dependent upon the particular key which is actuated.

14. In a machine for preparing shoe parts, a plurality of operating keys corresponding to the sizes of the work to be operated upon, movable gages for determining the position of a piece of work upon the machine, and mechanism co-acting with that one of the operating keys which is actuated to determine the position of the gages with respect to the work.

15. In a machine for preparing shoe parts, a plurality of operating keys, stops associated with said keys, movable mechanism adapted to be positioned in accordance with the key which is actuated, and means for moving said mechanism movable in a path intersecting the position of the stop whereby the range of movement is determined by said stop.

16. In a machine for preparing shoe parts, a plurality of operating keys, movable mechanism adapted to be positioned in accordance with the particular key which is actuated, power-operated means for moving said mechanism to a predetermined position, said means being constructed and arranged to co-act with an operating key, and a frictional connection between the power-operated means and the said mechanism.

17. In a machine for preparing shoe parts, a work-positioning device, a tool for operating upon a shoe upper part in predetermined relation to said positioning device, means for adjusting said positioning device in accordance with the size of the part, resilient means for adjusting the position of said tool constructed and arranged to force it into engagement with said work-positioning member, and means for moving said tool into engagement with the work.

18. In a machine for preparing shoe parts, work-positioning members, means for adjusting said members in accordance with the size of the shoe part, operating tools adapted to be applied to the work in a predetermined relation to said positioning members, resilient means for adjusting the positions of said tools by moving them into contact with respective work-positioning devices, and means for moving said tools into engagement with the work after they have been adjusted.

19. In a machine for preparing shoe parts, positioning devices for shoe upper parts adapted to be adjusted to accord with the size of the part, operating tools adapted to be adjusted in position by being brought into engagement with said positioning devices, another tool adapted to be adjusted in position with respect to said positioning devices, and an operating lever for adjusting the position of the latter tool resiliently connected to said first-mentioned tool to move them into engagement with the positioning means.

20. In a machine for preparing shoe parts, mechanism adapted to be positioned in accordance with a characteristic of the work to be operated upon, means variably to position said mechanism constructed and arranged to move it to place, and means for determining the effect of said positioning means upon said mechanism in accordance with another characteristic of said work.

21. In a machine for preparing shoe parts, adjustable mechanism adapted to be positioned in accordance with a characteristic of the work to be operated upon, power means for positioning said mechanism, and means for varying the connection between said positioning means and said mechanism in accordance with another characteristic of the work constructed and arranged to vary the position of said mechanism.

22. In a machine for preparing shoe parts, adjustable operating mechanism adapted to be positioned in accordance with one characteristic of the shoe part to be operated upon, power means for positioning said mechanism, and means for variably connecting said power positioning means and said mechanism variably to determine the effect of said power means in adjusting said mechanism in accordance with still another characteristic of the shoe part.

23. In a machine for preparing shoe parts, adjustable operating mechanism adapted to be variably positioned in accordance with the size of the work to be marked, power means for adjusting the position of said mechanism, and means variably to connect said power adjusting means and said mechanism in accordance with the style of the work.

24. In a machine for preparing shoe parts, mechanism adapted to be positioned in accordance with a characteristic of the work to be operated upon, means for positioning said mechanism, actuating means movable through a fixed range, and means for connecting the actuating means to said positioning means constructed and arranged to permit cessation of movement of said positioning means prior to the completion of the movement of the actuating means.

25. In a machine for preparing shoe parts, movable gages adapted to position the work upon the machine, means for moving said gages in accordance with one characteristic of the work, and means for adjusting the connection between said moving means and said gages constructed and arranged to permit the movement of the gages to correspond with another characteristic of the work.

26. In a machine for preparing shoe parts, a power-operated actuating lever, a plurality of stop members any one of which is adapted to be positioned in the path of movement of said lever to determine the limit of movement thereof, operating keys for said stop members, and means controlling said power means adapted to set it in operation constructed and arranged to be actuated by the movement of any one of the stop members.

27. In a machine for preparing shoe parts, a lever adapted to move through a variably predetermined distance in accordance with the size of the piece of work to be operated upon, another lever connected with the operating mechanism of the machine, means for adjustably interconnecting said members, and a manually operated device constructed and arranged to adjust the interconnection of said levers.

28. In a machine for preparing shoe parts, a plurality of levers, one of which is adapted to be moved through a variably predetermined distance in accordance with the size of the work and the other of which is connected to the operating tools of the machine, means for adjustably interconnecting said levers, and a manually operated lever normally free from said levers, said manually operated lever being provided with a latch constructed and arranged to disengage said interconnected levers and adjust the point of connection therebetween.

29. In a machine for preparing shoe parts, movable mechanism adapted to be positioned in accordance with the size of the work to be operated upon, means for moving said mechanism through a multiple of predetermined intervals determined by the size of the work, and means for varying said intervals in accordance with the system of gradation employed.

30. In a machine for preparing shoe parts, a plurality of operating keys adapted to be actuated in accordance with the size of the work to be operated upon, mechanism adapted to be positioned in accordance with the size of said work, and a manually adjustable lever constructed and arranged to vary the effective relation of the parts of said adjusting mechanism in accordance with the style of the work.

31. In a machine for preparing shoe parts, mechanism adapted to be positioned in accordance with one characteristic of the work to be operated upon, power-operated means for positioning said mechanism, a plurality of operating keys constructed and arranged to determine the magnitude of the effect of the power-operated means, and means connected with said operating keys constructed and arranged to set said power-operated means in motion.

32. In a machine for preparing shoe parts, operating mechanism adjustably positioned in the machine, power-operated means for moving said adjustable operating mechanism from starting position to a variably predetermined position in accordance with one characteristic of the work and then to return it to its original starting position during one cycle of the machine, and means for determining the starting position of said operating mechanism in accordance with another characteristic of the work.

33. In a machine for preparing shoe parts, operating mechanism adjustably mounted with respect to said machine, power-operated means for moving said mechanism from the original starting position to a variably predetermined position in accordance with the size of the part, causing it to operate upon the part and then returning it to its starting position, and means for varying the starting position of said mechanism in accordance with another characteristic of the shoe part such as its style.

34. In a machine for preparing shoe parts, skiving mechanism comprising an abutment adjustably positioned in the machine and adapted to be brought into and out of operative relation to the work, power mechanism for moving said abutment from the starting position through a variably predetermined range in accordance with the size of the work to bring it into and out of operative relation to the work and return it to starting position, and means for variably determining the starting position for said abutment in accordance with another characteristic of the work such as its style.

35. In a machine for preparing shoe parts, a movable head, a shoe part treating tool movably carried on said head, power means constructed and arranged to move said tool relatively to the head in accordance with one characteristic of the work, and means under the control of the operator for controlling the effectiveness of said power means in accordance with another characteristic of the work.

36. In a machine for preparing shoe parts, work-positioning means, operating means adjustably positioned in the machine with respect to said work-positioning means and movable throughout a limited range to position said operating means in accordance with the size of the work, and a style lever constructed and arranged to determine the effectiveness of said adjusting means so as to bring the desired range of movement for any style of shoe part within the limits of the range of the machine.

37. In a machine for preparing shoe parts, a movable head, operating instrumentalities adjustably carried on said head, power means constructed and arranged to adjust said instrumentalities relatively to each other and to the head, and means for controlling said power means in accordance with a characteristic of the work.

38. In a machine for preparing shoe parts, a movable head, operating tools movably carried on said head, power means constructed and arranged to adjust said tools relatively to each other and to the head in accordance with a characteristic of the work, and means under the control of the operator for controlling said power means.

39. In a machine for preparing shoe parts, a work support, adjustable gages for determining the position thereon of a shoe part applied to the machine, movable mechanism for operating upon the work adjustable with respect to said work support thereby to vary the effect of said mechanism upon the shoe part, said mechanism being adapted to be moved toward and away from said shoe part to treat the same, and power-operated means for adjusting and actuating said mechanism.

40. In a machine for preparing shoe parts, adjustable gages for determining the position of a vamp applied to the machine, movable operating mechanism adapted to be moved toward and away from the vamp to treat the same, and power-operated means for adjusting the relative position of the gages and said mechanism and for moving said operating mechanism against the vamp.

41. In a machine for preparing shoe parts, a movable head, an operating device movably carried upon said head, power-actuated means constructed and arranged to determine the position of said device upon the head, and means for actuating the head to bring the operating device into contact with the work.

42. In a machine for preparing shoe parts, a movable head, an operating device adjustably mounted on said head, means for determining the position of said device on the head in accordance with one characteristic of a shoe part to be operated upon, and means for determining the position of the device on the head in accordance with another characteristic of the work.

43. In a machine for preparing shoe parts, a movable head, an operating device adjustably carried on said head, means for determining the angular relation of said device with respect to the head, and power-actuated means for effecting movement of the device in another direction relatively to the head in accordance with the size of the shoe part.

44. In a machine for preparing shoe parts, a movable head, an operating device adjustably carried on said head, means for determining the angular relation of the operating device with respect to the head, and power-actuated means for determining the position of said device upon the head in accordance with a characteristic of the shoe part and for actuating the head to bring the operating device into engagement with the shoe part.

45. In a machine for preparing shoe parts, a movable head, an operating device adjustably mounted on the head, and power-actuated means for determining the position of said device upon the head in accordance with the size of the work and for moving the head to bring the operating device into contact with the work.

46. In a machine for preparing shoe parts, an operating device adapted to contact with the work, and power-actuated means constructed and arranged to move said device to a position adjacent to but spaced from the work, said power-actuated means including means constructed and arranged then to apply additional pressure to said device to cause the same to treat the work.

47. In a machine for preparing shoe parts, a movable head, an operating device carried on the head, means for moving the head to bring said device approximately into contact with but separated slightly from the work, and means for moving the operating device with respect to the head forcibly to bring it into contact with the work.

48. In a machine for preparing shoe parts, a movable head, a presser foot resiliently mounted on the head, an operating device loosely mounted on the head, means for moving the head to bring the presser foot into contact with the work with said operating device out of contact with the work, and means for moving said device with respect to the head to cause the same to contact with and treat the work.

49. In a machine for preparing shoe parts, a movable head, a plurality of operating tools adustably mounted on the head, and power-actuated means for adusting the position of said tools with respect to the head and for moving the head to bring the tools into contact with the work.

50. In a machine for preparing shoe parts, a work support, work gages thereon, a movable head, a plurality of operating devices adjustably mounted on the head, means for supporting said devices constructed and arranged to cause the same to assume positions symmetrical with respect to said head determined by said gages, and means for actuating the head to bring said devices into contact with the work.

51. In a machine for preparing shoe parts, a movable head, an elongated tool adjustably mounted on the head, means for moving the head to bring said tool into close relation to but spaced from the work, and other means for pressing said tool forcibly into contact with the work.

52. In a machine for preparing shoe parts, a substantially horizontal work support, a movable head, an elongated tool loosely mounted on the head and adjustable angularly with respect thereto about an upright axis, means for moving the head to bring said tool into close relation with the work, and means constructed and arranged to co-operate with said tool in any adjusted position thereof for then pressing said tool forcibly into contact with the work.

53. In a machine for preparing shoe parts, an elongated tool pivotally mounted in the machine, a lever for adjusting the angular position of said tool about an axis transverse to the length of the tool, and adjustable means for limiting the movement of said adjusting lever.

54. In a machine for preparing shoe parts, a plurality of operating devices, means for supporting said devices constructed and arranged to position them symmetrically with respect to the machine, power-operated means operable through a fixed range for moving said supporting means to adjust the position of said devices, and a resilient connection between the power-operated means and said supporting means.

55. In a machine for preparing shoe parts, a movable head, a plurality of operating devices, means for supporting said devices for adjustment with respect to the head constructed and arranged to position them symmetrically with respect to the head, and power-operated means for adjusting the position of said supporting means and actuating the head to bring the operating devices into contact with the work, said power-operated means being resiliently connected to said supporting means.

56. In a machine for preparing shoe parts, adjustable means for forming a mark on a shoe part, means for controlling the marking means to locate said mark in accordance with a characteristic of the shoe part, skiving mechanism for forming a scarf on said part, and means for controlling the operation of said skiving mechanism to cause one limit of said scarf to have a predetermined relation to said mark.

57. In a machine for preparing shoe parts, a plurality of marking devices adjustably mounted upon the machine, skiving mechanism, and power-operated means for determining the relative position of said marking devices and causing said skiving mechanism to remove a portion of the work at the mark applied by one of said marking devices.

58. In a machine for preparing shoe parts, a plurality of marking devices adjustably mounted upon the machine, skiving mechanism, and power-operated means for adjusting said marking devices transversely of the work and for operating said skiving mechanism to remove a portion of the work in predetermined relation to the marks applied by said marking devices.

59. In a machine for preparing shoe parts, a plurality of marking devices adjustable transversely and longitudinally with respect to the machine, skiving mechanism, and power-operated means for effecting the adjustment of and operating said marking devices and for operating said skiving mechanism to remove a portion of the work beyond the mark applied by one of said marking devices.

60. In a machine for preparing shoe parts, marking devices adjustable transversely of the work, skiving mechanism one portion of which is adjustable longitudinally of the work, and power-operated means for adjusting said marking devices and rendering said skiving mechanism effective at a predetermined distance from said marking devices.

61. In a machine of the character described, a movable head, a marking device adjustably mounted upon said head, skiving mechanism for removing a portion of the work beyond the mark applied by said marking device, and means for adjusting one of the elements of said skiving mechanism to cause it to assume a predetermined relation with respect to said marking device.

62. In a machine of the character described, a movable head, a marking device adjustably mounted on said head, means for skiving the work beyond the mark applied by said marking device comprising a cutting element and a work-positioning element, and power-operated means for adjusting said marking device and determining the initial position of one of the elements of said skiving mechanism.

63. In a machine of the character described, a movable head, a marking device adjustably mounted upon said head, skiving mechanism for removing a portion of the work beyond the mark applied by said marking device embodying a cutting element and a work-positioning element, one of said elements being mounted upon said movable head, and power-operated means for determining the position of said marking device and that one of the elements of the skiving mechanism which is mounted upon the movable head.

64. In a machine of the character described, a movable head, a marking device adjustably mounted upon said head, skiving mechanism intended to cut the work beyond the mark applied by said marking device embodying a cutting element and a work-positioning element, one of said elements being mounted upon said movable head, and power-operated means for determining the position of said marking device and that one of the elements of the skiving mechanism which is mounted upon the movable head, said power-operated means being arranged first to move the head into operative relation to the work.

65. In a machine of the character described, a movable head, a carriage adjustably mounted upon said head, a marking device mounted on said carriage, a sloping work-depressing abutment mounted on said carriage, a movable skiving knife, and power-operated means for actuating said head to bring the marking device and sloping abutment into contact with the work and to actuate said skiving knife to cut through the leather supported by said sloping abutment.

66. In a machine of the character described, a movable head, a marking device adjustably mounted on said head, a skiving knife movably mounted with respect to the head, and means movably mounted upon the head to render said skiving knife effective commencing at a predetermined position with respect to said marking device.

67. In a machine of the character described, a table supporting a piece of work, a skiving knife movable in the plane of the table beneath the work, a movable head, and means carried upon the head for depressing a portion of the work into the path of the skiving knife.

68. In a machine of the character described, a work supporting table, a skiving knife mounted for movement approximately in the plane of the table throughout a fixed range, a movable head, and means adjustably mounted on the head constructed and arranged to bring a portion of the work into the path of movement of the skiving knife and arranged to be adjusted to render said knife effective commencing at a point determined by a characteristic of the work.

69. In a machine of the character described, a supporting table, a skiving knife movably mounted approximately in the plane of the table, a movable head, a work-holding presser foot mounted on said head, an adjustable support on said head adapted to be positioned in accordance with a characteristic of the work, a marking device carried by said adjustable support, and means also carried by said support for rendering said skiving knife effective commencing at a point determined by a characteristic of the work and at a point in fixed relation to said marking device.

70. In a machine for preparing shoe parts, a work-positioning device for determining the position of a piece of work upon the machine, skiving mechanism, and power-operated means constructed and arranged to adjust a part of the skiving mechanism to render said skiving mechanism effective at a variably predetermined position with respect to the positioning device.

71. In a machine for preparing shoe parts, a plurality of work-positioning devices, skiving mechanism, and power-operated means both to determine the relative position of said work-positioning devices and to set in operation the skiving mechanism.

72. In a machine for preparing shoe parts, a plurality of work-positioning devices, skiving mechanism, and power-operated means constructed and arranged both to determine the relative position of said work-positioning devices and to render said skiving mechanism effective at a variably predetermined point with respect to the positioning members.

73. In a machine of the character described, a skiving knife mounted for movement in a fixed plane, means for intermittently moving said knife to advance it through the work, and means for reciprocating said knife concurrently with said intermittent advancing movements while in the work in another direction angularly related to the direction of said first movement.

74. In a machine of the character described, a skiving knife movable in a predetermined plane, and means for operating said knife to advance it through the work constructed and arranged to divide the advancing movement into a plurality of steps.

75. In a machine of the character described, a skiving knife movable in a predetermined plane, means for intermittently moving said knife in one direction to advance it through the work, and means for moving said knife in another direction laterally to said direction to cut the work during said advancing movement and for laterally returning the knife during the pauses between the advancing movements.

76. In a machine of the character described, a skiving knife movable in a predetermined plane, means for moving said knife forward intermittently to cut the work, means for moving said knife laterally in one direction during said forward movement, and means for moving the knife laterally in the opposite direction during the intervals between the forward movements.

77. In a machine of the character described, a plurality of operating keys, skiving mechanism including a knife, and mechanism set in motion by the actuation of an operating key for determining the initial postion of said skiving mechanism where the knife enters the work and for causing the skiving mechanism to cut the work.

78. In a machine of the character described, a plurality of operating keys, skiving mechanism including elements adapted to be positioned upon opposite sides of a piece of work, and power-operated mechanism set in motion by the actuation of an operating key for determining the initial position of one of the elements of said skiving mechanism with respect to the work and for moving the other element to effect the cutting of the work.

79. In a machine of the character described, a plurality of operating keys, skiving mechanism including elements adapted to be positioned upon opposite sides of a piece of the work, and power-operated means set in motion by the actuation of a particular operating key for determining the initial position of the elements of said skiving mechanism and for moving one of the elements of said skiving mechanism with respect to the other element to cause the cutting of the work.

80. In a machine of the character described, a work-positioning device, a skiving knife movable with respect to said device, a carriage for said knife, means for moving said knife carriage to adjust its initial position with respect to the work-positioning device, and means for moving said knife forward in the work through a predetermined range subsequent to its initial adjusting movement.

81. In a machine of the character described, a work-positioning levice, a skiving knife movably mountel on the machine, means for moving said knife to adjustably determine the initial cutting position thereof with respect to said work-positioning device, means movably mounted on the machine for rendering said knife effective, and means for adjustably determining the initial position of said latter means with respect to said work-positioning device.

82. In a machine of the character described, a skiving knife movably mounted with respect to the machine arranged to engage the work from one surface thereof, co-operating means for pushing the work into engagement with said knife arranged to engage the other surface of the work, said means being movably mounted on the machine, and means for initially adjusting the said knife and said work-contacting means constructed and arranged to keep them in fixed relation the one to the other.

83. In a machine of the character described, a movable carriage, a skiving knife mounted on said carriage, power-operated means for moving said carriage to advance the knife through the work, means for intermittently connecting said power-operated means to the carriage, and means for returning the carriage to its original position after it has been disconnected from the actuating means.

84. In a machine for preparing shoe parts, adjustable work-positioning means to determine the position of a piece of work upon the machine, mechanism for applying a reinforcement tab to the piece of work positioned by said means, and power-operated means to adjust the relative position of said work-positioning means and to cause said reinforcement-applying mechanism to apply a reinforcement tab with a predetermined relation to said work-positioning means.

85. In a machine for preparing shoe parts, a plurality of work-positioning devices adjustably mounted upon the machine, mechanism for applying a reinforcement tab to the work positioned by said devices, and power-operated means constructed and arranged relatively to adjust said work-positioning devices and to cause said mechanism to apply a reinforcement tab at a point symmetrical with respect to said positioning devices.

86. In a machine for preparing shoe parts, skiving mechanism, mechanism for applying a reinforcing tab, a work-positioning device common to both of said mechanisms, and means for operating said skiving mechanism and said reinforcement-applying mechanism.

87. In a machine for preparing shoe parts, skiving mechanism, mechanism for applying a reinforcing tab, means for operating both of said mechanisms constructed and arranged to render said skiving mechanism effective at a variably predetermined position with respect to the position at which the reinforcement tab is applied to the work, and a work-positioning device common to both of said mechanisms.

88. In a machine for preparing shoe parts, work-positioning mechanism, an adjustable marking device, skiving mechanism, and power-operated means for operating said marking mechanism and said skiving mechanism in predetermined positions with respect to one another and the work-positioning devices.

89. In a machine for preparing shoe parts, mechanism for applying a reinforcement to one surface of a shoe part comprising means for severing said reinforcement from a supply strip, means for applying an adhesive to only the portion to be severed, and means for pushing said reinforcement into contact with the shoe part.

90. In a machine for preparing shoe parts, mechanism for applying a reinforcing tab separated from a supply strip of reinforcement material comprising means for severing a portion of said strip of reinforcement material to form a tab constructed and arranged first to move said severing means frictionally to engage said strip, then to move the severing means laterally to feed the strip, and then to move said means to sever a portion of the strip.

91. In a machine for preparing shoe parts, mechanism for applying a reinforcement tab formed from a strip of reinforcement material comprising a knife, means for moving said knife to cause it partially to sever the strip of material, means for moving said knife in another direction to drag along the strip of material in order to feed a portion of the same, and means to move said knife to complete the severance of a tab formed from said strip.

92. In a machine of the character described, mechanism for applying a reinforcement tab comprising a carriage, a cutting device movably mounted on said carriage, means for moving said cutting device partially through the strip of reinforcement material, means for moving the carriage to feed the strip, means for moving the cutting device to sever the strip, and means for applying the severed portion to the work.

93. In a machine of the character described, a carriage, means mounted on said carriage for severing a portion of reinforcement material from a supply strip, means for supplying an adhesive to said material, and means for moving the carriage and the cutting device constructed and arranged to feed the strip of reinforcement material and to apply a severed portion thereof to the work.

94. In a machine of the character described, mechanism for securing a reinforcement by adhesive to the surface of a piece of work comprising means for supplying an adhesive material to a strip of reinforcement material, means for rendering said supplying means intermittently effective, means for feeding the reinforcement material with respect to said mechanism, and means for severing a portion of the reinforcement and applying it to the work.

95. In a machine of the character described, a guide for a strip of reinforcement material, a movable carriage, severing means mounted on said carriage, means for moving said severing means into engagement with the work, means for moving the carriage laterally to feed the strip of material, means for forcing the severing means through the work, and means mounted on said carriage for pushing the reinforcement into contact with the work.

96. In a machine of the character described, mechanism for applying a reinforcement tab to the surface of a piece of work to strengthen the work, comprising means for pushing a piece of adhesive-coated reinforcement material into engagement with the work, and means for applying a separate protecting cover to the work over said reinforcement.

97. In a machine of the character described, mechanism for applying an adhesive coated loose reinforcement tab to the flat surface of a piece of work to strengthen the work, comprising means constructed and arranged to move the tab relatively to the work from one operative position to another in which latter position said means is arranged for movement relatively to the work to apply the loose tab of adhesive coated material and to press it into engagement with the work.

98. In a machine of the character described, mechanism for applying a reinforcement tab made from the terminal portion of a supply strip to the flat surface of a piece of work to strengthen the work, comprising means for applying an adhesive to one surface of said tab portion only and pressing the tab into engagement with the work.

99. In a machine of the character described, mechanism for applying a reinforcement tab to the flat surface of a piece of work to strengthen the work, comprising means for applying an adhesive to one surface of the tab and pushing it into engagement with the work and means for applying a protecting cover to the work over said reinforcement.

100. In a machine of the character described, means for intermittently applying paste to a strip of reinforcement material, means for severing a portion of said strip and applying it to the work to strengthen the work, means for feeding a slightly larger portion of protective covering, and means for securing said portion to the work around the reinforcement.

101. In a machine of the class described, adjustable work-positioning devices, power-operated means to adjust the position of said devices in accordance with a characteristic of the work, and power-operated mechanism for applying a reinforcement to the work to strengthen the work comprising means for severing a portion of a strip of material, means for moving said severed portion into a predetermined relation with respect to said work-positioning devices, and means for applying the reinforcement to the surface of the work.

102. In a machine of the character described, a work-supporting and positioning device movably mounted with respect to the machine, means for retaining the work in the position determined by said device constructed and arranged to be applied to one surface of the work, means for applying a reinforcement to the other surface of the work, and power-operated means for adjusting said work-positioning device and bringing said work-retaining means and said reinforcement-applying means toward opposite sides of the work in co-acting relation the one with the other.

103. In a machine of the class described, movable work-positioning devices adapted to be positioned in accordance with a characteristic of the work, means for positioning said devices, reinforcement-applying mechanism constructed and arranged to be moved laterally with respect to the work to a predetermined position, power-operated means rigidly connected to said reinforcement-applying mechanism to move the same, and a frictional connection between said means and the means for adjusting the work-positioning devices.

104. In a machine for preparing shoe parts, a work-positioning and supporting device movably mounted with respect to the machine, means for feeding a strip of previously coated adhesive material, means for moistening the adhesive strip, and means for severing a moistened portion of the strip and applying it to the surface of a piece of work.

105. In a machine for preparing shoe parts, a work-positioning and supporting device movably mounted with respect to the machine, means for feeding a strip of adhesive material to expose a portion of the end thereof, and means for subsequently applying moisture to the exposed end portion of said adhesive strip.

106. In a machine for preparing shoe parts, a work-positioning and supporting device movably mounted with respect to the machine, means for feeding a strip of adhesive material to expose a portion of the end thereof, means for subsequently applying moisture to the exposed end portion of said adhesive strip, and means for severing the moistened portion.

107. In a machine for preparing shoe parts, a work-positioning and supporting device movably mounted with respect to the machine, means for feeding a strip of adhesive material to expose a portion of the end thereof, means for subsequently applying moisture to the exposed end portion of said adhesive strip, means for severing the moistened portion, and means for applying the severed portion to the work.

108. In a machine for preparing shoe parts, mechanism for applying a reinforcement to the work comprising means for intermittently applying an adhesive material to one side of the reinforcement material, means for engaging said strip and feeding it forward to a predetermined position, means for severing a portion of the strip, means for applying said severed portion to the work, means for feeding a strip of adhesive material between said applying means and the reinforcement, means for moistening said adhesive strip, and means for severing a portion of the moistened adhesive material and applying it to the work over the reinforcement.

109. In a machine of the character described, work-supporting means including a guideway for a strip of reinforcement material, a paste-supplying reservoir provided with an opening over said guideway, means normally closing said opening, a carriage movable substantially in line with said guideway, a plunger carried by said carriage, means for moving said plunger against the strip arranged to open the paste reservoir and apply paste to the strip, severing means mounted on the carriage, means for moving said severing means into engagement with the strip, means for moving the carriage to an intermediate position, means for moving the severing means to sever the strip, means for again moving the carriage to a predetermined position with respect to the work, and means for applying the severed portion to the work.

110. In a machine of the character described, a movable carriage having a supply of reinforcement material and provided with reinforcement-severing and applying mechanism, other mechanism supported on said carriage arranged to serve and moisten a strip of adhesive-coated material, and means for causing said reinforcement-applying mechanism to sever the served portion of the adhesive strip to apply it to the work over the reinforcement.

111. In a machine for preparing shoe parts, tip reinforcement applying mechanism, marking mechanism constructed and arranged to apply a linear mark to determine the position for the attachment of the tip reinforcement, and power-operated means for actuating said marking mechanism and causing said reinforcement-applying mechanism to press a reinforcement tab against the work in predetermined relation to the linear mark.

112. In a machine for preparing shoe parts, marking mechanism adjustably mounted upon the machine, mechanism for applying a reinforcement tab to the work, and power-operated means for adjusting and operating said marking mechanism and for causing the reinforcement-applying mechanism to apply a tab at a variably predetermined position with respect to the mark applied by the marking mechanism.

113. In a machine for preparing shoe parts, means for applying a plurality of marks at separated points upon the work, reinforcement-applying mechanism, and power-operated means for actuating said marking devices and said reinforcement-applying mechanism to apply a reinforcement in a predetermined position to the marks applied by said marking mechanism.

114. In a machine for preparing shoe parts, marking mechanism, mechanism for applying a reinforcement tab, and power-operated means for actuating said marking mechanism to apply a mark to the work and actuating said reinforcement-applying mechanism to apply a reinforcement tab to the work at substantially the same time.

115. In a machine for preparing shoe parts, symmetrically adjustable means for applying a plurality of point marks upon the work, means for applying a reinforcing tab to the work by pressing said tab into contact therein by power-operated means for actuating said marking devices, and causing the applying means to apply a reinforcement tab at a point between the marks applied by the marking devices, and a common work-positioning device for said marking device and said tab-applying means.

116. In a machine for preparing shoe parts, adjustable work-positioning devices, a marking device adjustably mounted with respect to said work-positioning devices, skiving mechanism, and power-operated means for adjusting said positioning devices and said marking devices and for rendering said skiving mechanism effective at a variably predetermined position with respect to one of said mechanisms.

117. In a machine for preparing shoe parts such as vamps, adjustable work-positioning devices, a marking device adjustably mounted with respect to said positioning devices constructed and arranged to mark a tip line, skiving mechanism for removing a portion of the work beyond the tip line indicated by said marking device, a reinforcing device for applying a reinforcing tab adjacent to the throat of the vamp, and power-operated means for adjusting and operating said mechanism to apply a reinforcement, to make a mark to locate the tip seam, and to skive the work in predetermined relation to the tip seam mark.

118. That improvement in the art of preparing vamps which consists in applying a piece of reinforcing material to the vamp and holding it temporarily in position by means of a layer of destructible material superposed upon the applied reinforcement.

119. That improvement in the art of preparing vamps which consists in applying a reinforcement to the vamp, securing it temporarily in position by an adhesive, superposing a layer of tissue over the reinforcement and the vamp, and securing said tissue to the vamp around the reinforcement.

120. The method of applying a reinforcement to the throat of a vamp which consists in severing a portion of reinforcement material from a supply strip, positioning said severed portion on the vamp, and applying a temporary cover of adhesive-coated tissue.

121. The method of applying a reinforcement to the throat of a vamp which consists in severing a portion of a strip of reinforcement material, positioning the severed portion on the vamp, temporarily securing it in position by means of adhesive interposed between the reinforcement and the vamp, and applying a temporary retaining cover of adhesive-coated tissue and causing the same to adhere to the vamp around the reinforcement.

122. The method of applying a reinforcement to the throat of a vamp which consists in applying an adhesive to the end of a strip of reinforcement material, severing a portion of the end of the strip to which the adhesive has been applied, pressing the severed portion in position on the vamp, moistening the end of a strip of adhesive-coated tissue paper, severing said moistened portion and applying it to the vamp over the reinforcement.

123. That improvement in the art of preparing shoe parts which consists in removing a portion of the leather along a continuous cut in one direction by successive knife reciprocations of which alternate ones are angular transverse advancing movements and the intermediate ones are return movements which do not cut the work.

124. In a machine of the character described, mechanism for applying an adhesive-coated reinforcement tab to the flat surface of a piece of work, comprising means for severing a short reinforcement tab from a supply strip, and means reciprocable toward and away from the work for applying to and pressing the previously severed loose tab into engagement with the work.

In testimony whereof I have signed my name to this specification.

HERBERT ELLIOT ENSLIN.